US012657810B2

(12) United States Patent
Mitra et al.

(10) Patent No.: US 12,657,810 B2
(45) Date of Patent: Jun. 16, 2026

(54) TEMPORAL COHERENCE FOR RAY TRAVERSAL

(71) Applicant: QUALCOMM Incorporated, San Diego, CA (US)

(72) Inventors: Syamantak Mitra, Kolkata (IN); Anamitra Mani, Kolkata (IN); Geetika Malhotra, Bangalore (IN); Kalyan Kumar Bhiravabhatla, Bengaluru (IN); Alexei Vladimirovich Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 18/492,719

(22) Filed: Oct. 23, 2023

(65) Prior Publication Data

US 2025/0131638 A1     Apr. 24, 2025

(51) Int. Cl.
*G06T 15/06*          (2011.01)
*G06T 17/00*          (2006.01)

(52) U.S. Cl.
CPC ............ *G06T 15/06* (2013.01); *G06T 17/005* (2013.01); *G06T 2210/21* (2013.01)

(58) Field of Classification Search
CPC .... G06T 15/06; G06T 17/005; G06T 2210/21
See application file for complete search history.

(56) References Cited

U.S. PATENT DOCUMENTS

| | | | | |
|---|---|---|---|---|
| 2008/0180440 A1* | 7/2008 | Stich | ...................... | G06T 15/40 345/426 |
| 2015/0287233 A1* | 10/2015 | Shin | ........................ | G06T 15/10 345/419 |
| 2017/0061673 A1* | 3/2017 | Park | ........................ | G06T 15/06 |
| 2022/0406000 A1* | 12/2022 | Drane | ................... | G06T 15/205 |

OTHER PUBLICATIONS

Directx-Specs: "DirectX Raytracing (DXR) Functional Spec", Jan. 11, 2023, pp. 1-210, pp. 18,21,145,170 (Year: 2023).*
Directx-Specs: "DirectX Raytracing (DXR) Functional Spec", Jan. 11, 2013, pp. 1-210, XP093229598, p. 13-p. 14, p. 57-p. 58, p. 137-p. 141.

(Continued)

*Primary Examiner* — Daniel F Hajnik
*Assistant Examiner* — Chris Alejandro Puntier
(74) *Attorney, Agent, or Firm* — Procopio, Cory, Hargreaves & Savitch LLP

(57) ABSTRACT

Aspects presented herein relate to methods and devices for graphics processing including an apparatus, e.g., a GPU. The apparatus may perform a ray traversal process for a second frame in a set of frames starting at a first node in a plurality of nodes, where a ray in the ray traversal process previously intersected a first primitive in a first frame, where the first primitive corresponds to a first node ID. The apparatus may also detect whether the ray intersects the first primitive in the second frame. Further, the apparatus may store the first node ID for the first node based on the ray intersecting the first primitive in the second frame, or re-perform the ray traversal process for the second frame starting at a root node in the plurality of nodes based on the ray not intersecting the first primitive in the second frame.

27 Claims, 15 Drawing Sheets

(56)               References Cited

OTHER PUBLICATIONS

International Search Report and Written Opinion—PCT/US2024/046153—ISA/EP—Dec. 12, 2024.

Liu L., et al., "Intersection Prediction for Accelerated GPU Ray Tracing", Proceedings of the 1st International Workshop on Extreme Heterogeneity Solutions, ACMPUB27, New York, NY, USA, Oct. 18, 2021, pp. 709-723, XP058989101, abstract, sections 1, 2.1, 2.2, 2.4, 3, 4.1-4.4, 6, 6.4, 8, figures 3, 4, 5, 10.

Mattausch O., et al., "CHC+RT: Coherent Hierarchical Culliing for Ray Tracing", Chapter 1: Monte Carlo Path Tracing, Wiley-blackwell, Oxford, vol. 34, No. 2, Jun. 22, 2015, pp. 537-548, XP071544907, Sections 3, 4, 4.1-4.5, 5.1, figure 3.

* cited by examiner

200

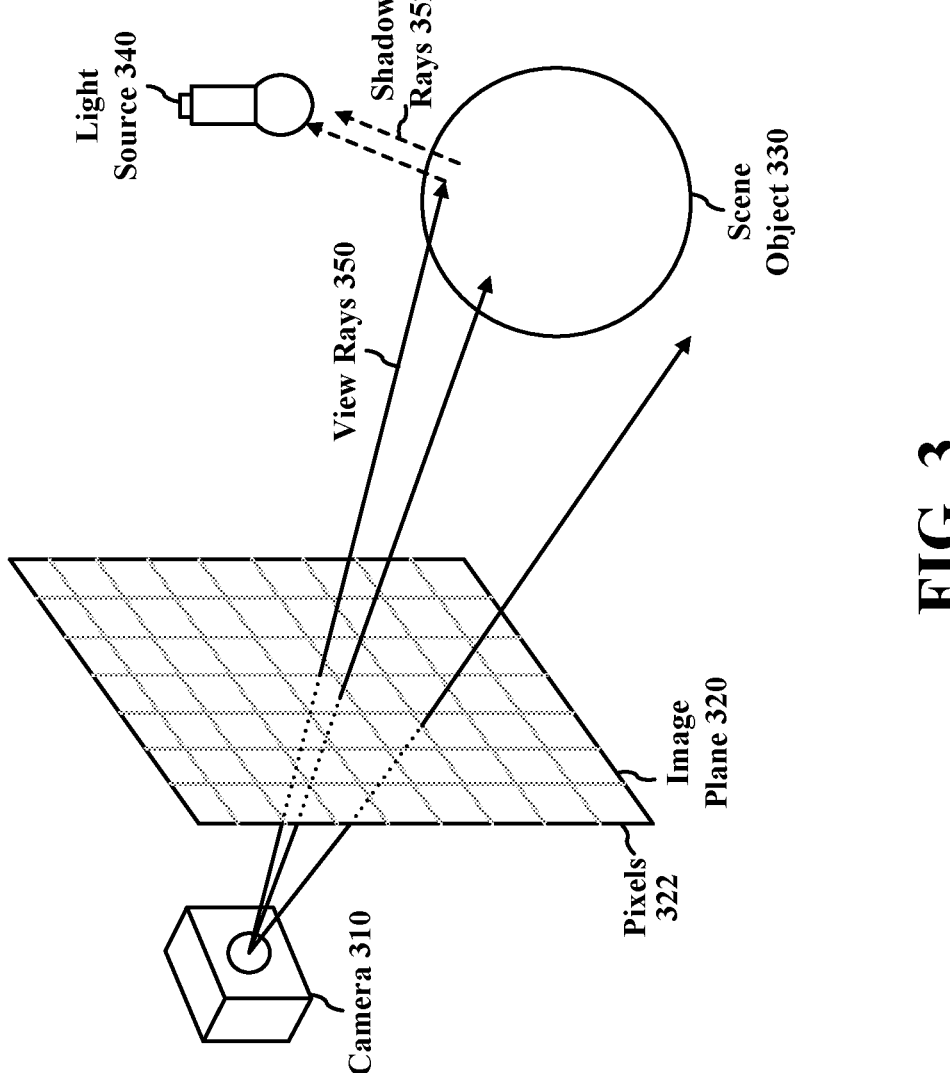
FIG. 3

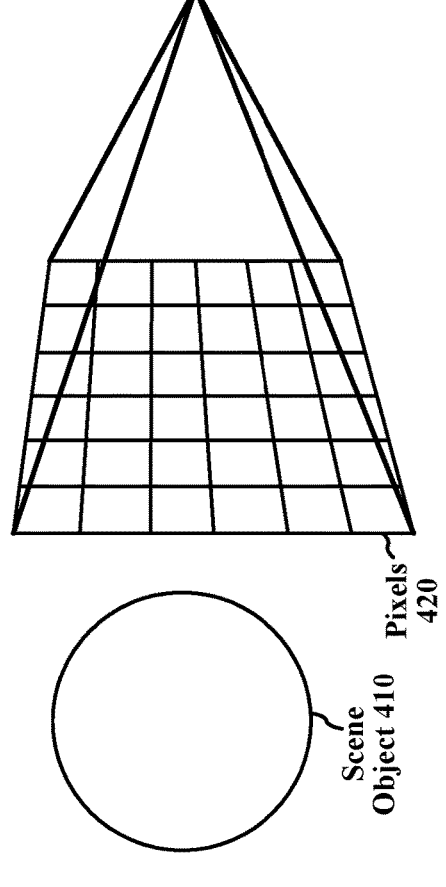
FIG. 4A
Scene Object 410
Pixels 420
400
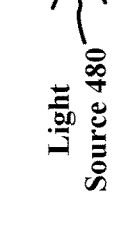
FIG. 4B
Primary Ray 484
Shadow Ray 482
Light Source 480
Scene Object 460
Pixels 470
450

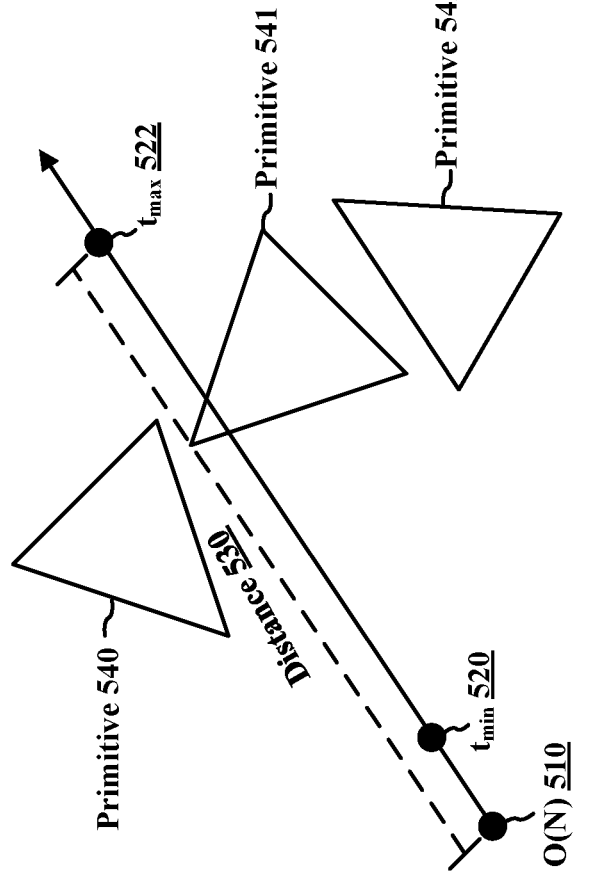
FIG. 5

BVH 905 for Frame 901

Traversing down the nodes

Node hit

Cache this node ID

BVH 1005 for Frame 902

Start intersection test from cached node

Cached Node ID

No traversal necessary

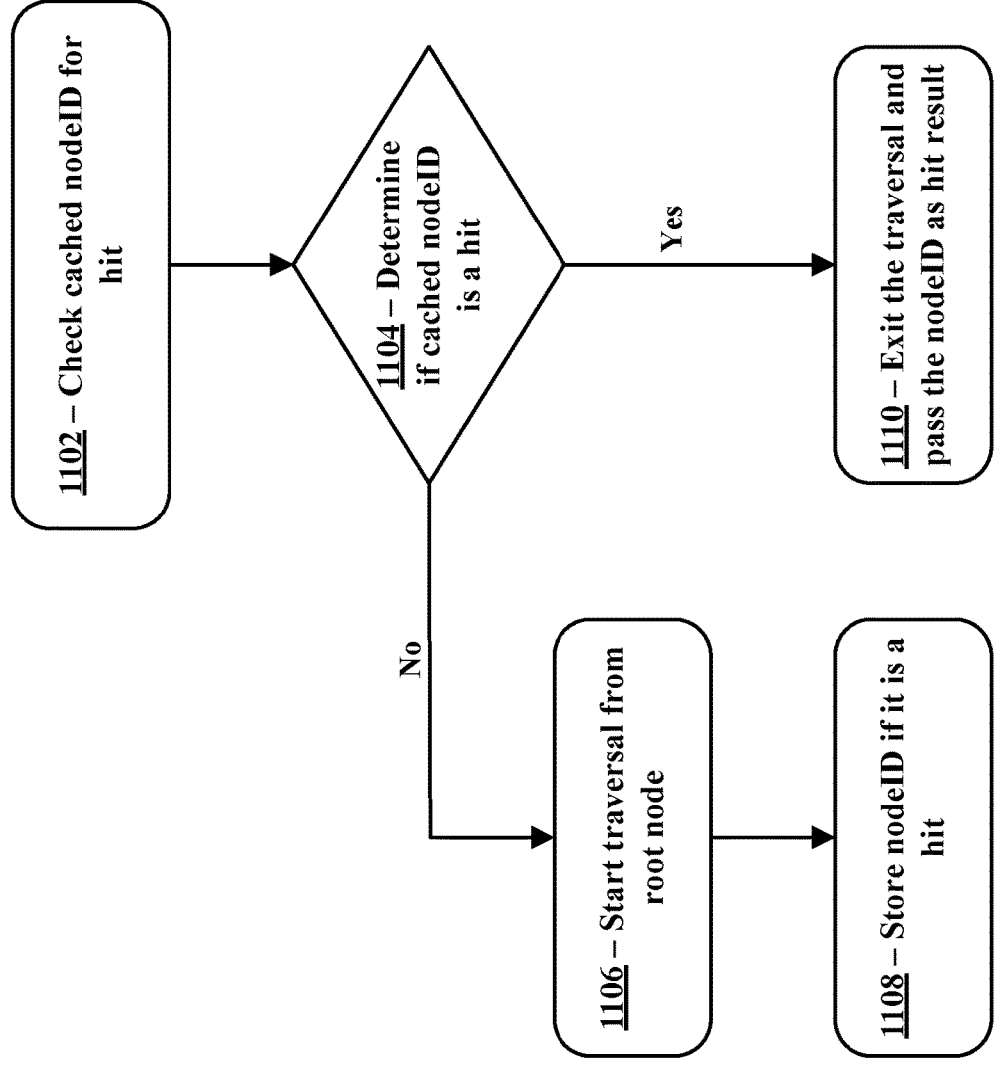
FIG. 11

1200

1202 – Update tMax with the cached tHit from the previous frame. tMax = tHit + ε

1204 – Perform closest hit traversal with shortened ray interval {tMin, Cached tHit}

1206 – Found closest hit?

Yes

No

1212 – Exit traversal and cache the tHit for next frame

1208 – Perform closest hit traversal with shortened ray interval {Cached tHit, tMax}

1210 – Cache the tHit for next frame

1300

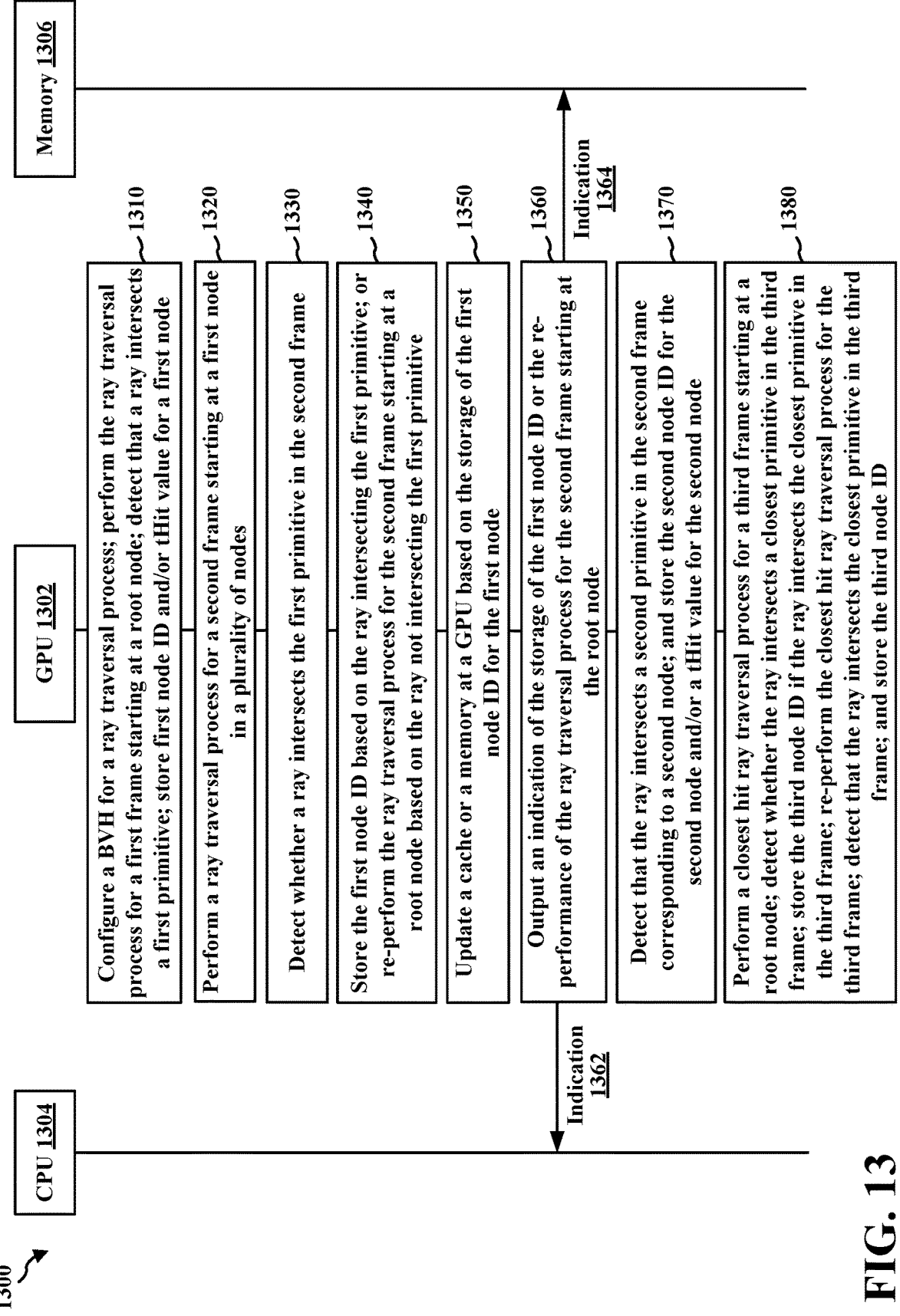

GPU 1302

Configure a BVH for a ray traversal process; perform the ray traversal process for a first frame starting at a root node; detect that a ray intersects a first primitive; store first node ID and/or tHit value for a first node —1310

Perform a ray traversal process for a second frame starting at a first node in a plurality of nodes —1320

Detect whether a ray intersects the first primitive in the second frame —1330

Store the first node ID based on the ray intersecting the first primitive; or re-perform the ray traversal process for the second frame starting at a root node based on the ray not intersecting the first primitive —1340

Update a cache or a memory at a GPU based on the storage of the first node ID for the first frame —1350

Output an indication of the storage of the first node ID or the re-performance of the ray traversal process for the second frame starting at the root node —1360

Detect that the ray intersects a second primitive in the second frame corresponding to a second node; and store the second node ID for the second node and/or a tHit value for the second node —1370

Perform a closest hit ray traversal process for a third frame starting at a root node; detect whether the ray intersects a closest primitive in the third frame; store the third node ID if the ray intersects the closest primitive in the third frame; re-perform the closest hit ray traversal process for the third frame; detect that the ray intersects the closest primitive in the third frame; and store the third node ID —1380

Memory 1306

Indication 1364

Indication 1362

CPU 1304

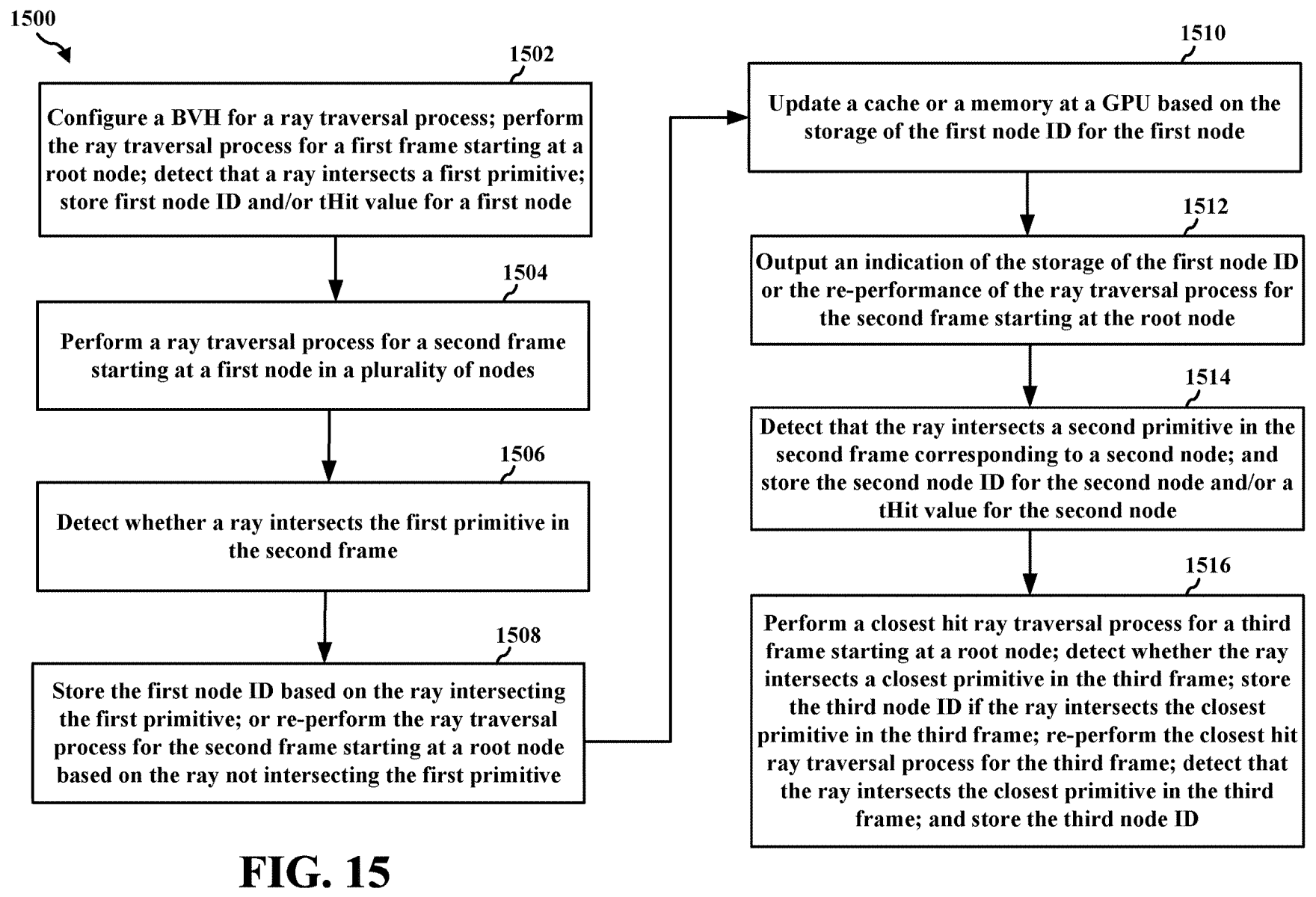

Configure a BVH for a ray traversal process; perform the ray traversal process for a first frame starting at a root node; detect that a ray intersects a first primitive; store first node ID and/or tHit value for a first node

1504

Perform a ray traversal process for a second frame starting at a first node in a plurality of nodes

1506

Detect whether a ray intersects the first primitive in the second frame

1508

Store the first node ID based on the ray intersecting the first primitive; or re-perform the ray traversal process for the second frame starting at a root node based on the ray not intersecting the first primitive

1510

Update a cache or a memory at a GPU based on the storage of the first node ID for the first node

1512

Output an indication of the storage of the first node ID or the re-performance of the ray traversal process for the second frame starting at the root node

1514

Detect that the ray intersects a second primitive in the second frame corresponding to a second node; and store the second node ID for the second node and/or a tHit value for the second node

1516

Perform a closest hit ray traversal process for a third frame starting at a root node; detect whether the ray intersects a closest primitive in the third frame; store the third node ID if the ray intersects the closest primitive in the third frame; re-perform the closest hit ray traversal process for the third frame; detect that the ray intersects the closest primitive in the third frame; and store the third node ID

FIG. 15

TEMPORAL COHERENCE FOR RAY TRAVERSAL

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

Currently, there is a need for improved graphics processing. For instance, current node storage techniques in graphics processing may not efficiently store acceleration structures. Accordingly, there has developed an increased need for improved node storage techniques to efficiently store acceleration structures.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a GPU, or any apparatus that may perform graphics processing. The apparatus may configure a bounding volume hierarchy (BVH) for the ray traversal process. The apparatus may also perform the ray traversal process for the first frame starting at the root node in the plurality of nodes, where the BVH includes the plurality of nodes, and where each node in the plurality of nodes corresponds to at least one primitive in a plurality of primitives in the set of frames. The apparatus may also detect that the ray in the ray traversal process intersects the first primitive in the first frame corresponding to the first node in the plurality of nodes, where the first node includes the first node ID. Additionally, the apparatus may store at least one of the first node ID for the first node or a tHit value for the first node, where the tHit value for the first node is a previous distance at which the ray struck primitives associated with the first node. The apparatus may also perform a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames. The apparatus may also detect whether the ray intersects the first primitive in the second frame. Moreover, the apparatus may store the first node ID for the first node based on the ray intersecting the first primitive in the second frame, or re-perform the ray traversal process for the second frame starting at a root node in the plurality of nodes based on the ray not intersecting the first primitive in the second frame. The apparatus may also update a cache at a graphics processing unit (GPU) or a memory at the GPU based on the storage of the first node ID for the first node, where the first frame is a previous frame in the set of frames and the second frame is a current frame in the set of frames, and where the first node is a cache node in the plurality of nodes. The apparatus may also output an indication of the storage of the first node ID for the first node or the re-performance of the ray traversal process for the second frame starting at the root node. The apparatus may also detect that the ray intersects a second primitive in the second frame corresponding to a second node in the plurality of nodes, where the second node includes a second node ID. Additionally, the apparatus may store at least one of the second node ID for the second node or a tHit value for the second node, where the tHit value for the second node is a previous distance at which the ray struck primitives associated with the second node. The apparatus may also perform, based on a first ray interval, a closest hit ray traversal process for a third frame in the set of frames starting at the root node, where the first ray interval is equal to a difference between a tMin value (or Tmin value) for a third node in the plurality of nodes and a tHit value (or Thit value) for the third node, where the tMin value for the third node is a minimum distance from a ray origin point for the ray to strike primitives associated with the third node, and where the tHit value for the third node is a previous distance at which the ray struck the primitives associated with the third node. The apparatus may also detect whether the ray intersects a closest primitive in the third frame, where the closest primitive corresponds to a third node ID for the third node. Moreover, the apparatus may store the third node ID for the third node if the ray intersects the closest primitive in the third frame. The apparatus may also re-perform, based on a second ray interval, the closest hit ray traversal process for the third frame starting at the root node, where the second ray interval is equal to a difference between the tHit value for the third node and a tMax value (or Tmax value) for the third node, where the tMax value for the third node is a maximum distance from a ray origin point for the ray to strike primitives associated with the third node. The apparatus may also detect, based on the re-performance, that the ray intersects the closest primitive in the third frame; and store the third node ID for the third node based on the detection.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 is a diagram illustrating an example ray tracing process.

FIG. 4A is a diagram illustrating an example rasterization process.

FIG. 4B is a diagram illustrating an example ray tracing process.

FIG. 5 is a diagram illustrating an example ray tracing process.

FIG. 9 is a diagram illustrating an example of a BVH for a ray traversal process.

FIG. 10 is a diagram illustrating an example of a BVH for a ray traversal process.

FIG. 11 is a diagram illustrating an example of a flowchart for a ray tracing operation.

FIG. 13 is a communication flow diagram illustrating example communications between a GPU, a CPU, and a memory.

FIG. 15 is a flowchart of an example method of graphics processing.

DETAILED DESCRIPTION

Figure 1:
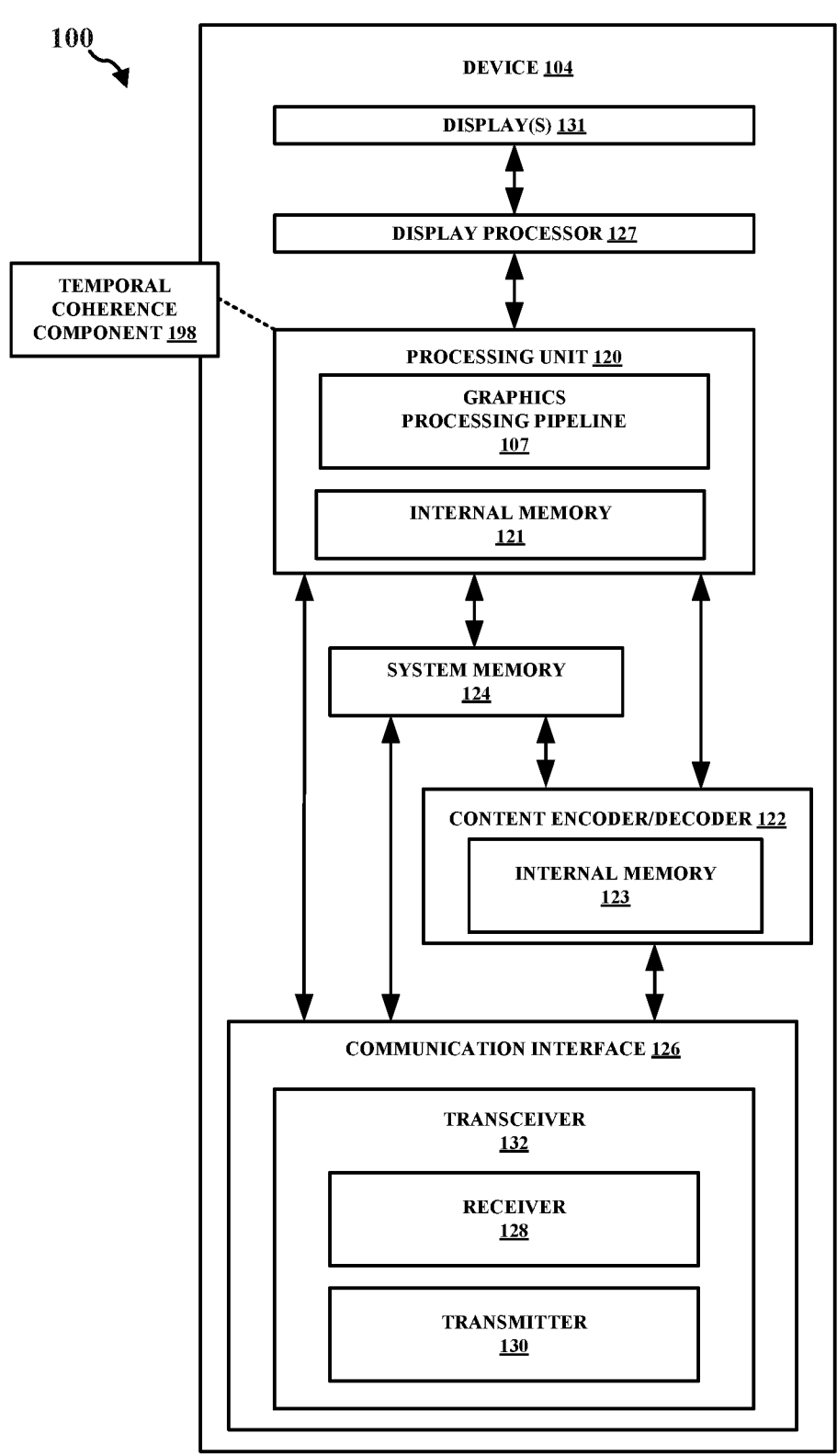
FIG. 1 is a block diagram that illustrates an example content generation system.

Ray tracing is a rendering technique used to generate images by tracing paths of light through a three-dimensional (3D) scene. In a typical ray tracing operation, multiple rays are transmitted per pixel through a bounding volume hierarchy (BVH). Also, ray triangle intersections are computed using acceleration structures (e.g., BVHs) that are built over primitives. With an increase in resolution and complex geometries, ray traversal is becoming very computationally intensive. Each ray may need to be intersected with multiple BVH nodes in order to reach a desired, final result. Also, every BVH tree hop or node may add memory accesses and additional arithmetic logic unit (ALU) operations for performing the intersections. Aspects of the present disclosure may reduce the amount of calculations and/or operations that are utilized for performing ray tracing. For instance, aspects of the present disclosure may reduce the amount of calculations and/or operations that are utilized for performing intersections during ray tracing. In order to do so, aspects of the present disclosure may reduce the total number of BVH tree hops utilized for completing a ray traversal process.

Aspects of the present disclosure may include a number of benefits or advantages. For instance, aspects of the present disclosure may reduce the amount of calculations and/or operations that are utilized for performing ray tracing. In order to do so, aspects of the present disclosure may reduce the total number of BVH tree hops utilized for completing a ray traversal process. Additionally, aspects presented herein may reduce the total number of BVH tree hops or nodes by utilizing temporal coherence across frames. By utilizing temporal coherence across frames, aspects presented herein may reduce the amount of calculations and/or operations that are utilized for performing ray tracing. That is, by utilizing temporal coherence across frames, aspects presented herein may reduce the amount of memory accesses and additional ALU operations for performing the intersections in ray tracing. Also, by utilizing temporal coherence across frames, aspects presented herein may reduce the overall cost of the ray traversal process.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. In some aspects of graphics processing, loading these acceleration structures (e.g., BVH structures) into on-chip graphics memory at a GPU may help to achieve quicker access to data and eventually faster ray tracing performance. However, in some instances, the size of the acceleration structures (e.g., BVH structures) may be much larger than the size of the on-chip memory. In order to overcome this size differential, smaller acceleration structures may be loaded onto the on-chip memory in a fashion similar to top level acceleration structures. Also, some small bottom level acceleration structures (i.e., small in size compared to top level acceleration structures) may also be placed in the on-chip memory. However, due to the organization of the bottom level acceleration structures, it may be difficult to access these bottom level acceleration structures from the on-chip memory. As such, these bottom level acceleration structures may not be able to be accessed frequently enough to satisfy ray tracing performance specifications. Aspects of the present disclosure may optimize the storage of acceleration structures (e.g., BVH structures) associated with ray tracing processes. For instance, aspects of the present disclosure may store bottom level acceleration structures in certain types of memory such that these structures are easily accessible. In order to do so, aspects of the present disclosure may store bottom level BVH structures in an on-chip graphics memory (GMEM), as well as store the bottom level BVH structures in a system memory (SYSMEM). By doing so, aspects presented herein may more easily access the BVH structures from the on-chip graphics memory. In some instances, aspects of the present disclosure may store different levels of the bottom level BVH structures in both on-chip graphics memory and system memory.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a temporal coherence component 198 configured to configure a bounding volume hierarchy (BVH) for the ray traversal process. The temporal coherence component 198 may also be configured to perform the ray traversal process for the first frame starting at the root node in the plurality of nodes, where the BVH includes the plurality of nodes, and where each node in the plurality of nodes corresponds to at least one primitive in a plurality of primitives in the set of frames. The temporal coherence component 198 may also be configured to detect that the ray in the ray traversal process intersects the first primitive in the first frame corresponding to the first node in the plurality of nodes, where the first node includes the first node ID. The temporal coherence component 198 may also be configured to store at least one of the first node ID for the first node or a tHit value for the first node, where the tHit value for the first node is a previous distance at which the ray struck primitives associated with the first node. The temporal coherence component 198 may also be configured to perform a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames. The temporal coherence component 198 may also be configured to detect whether the ray intersects the first primitive in the second frame. The temporal coherence component 198 may also be configured to store the first node ID for the first node based on the ray intersecting the first primitive in the second frame, or re-perform the ray traversal process for the second frame starting at a root node in the plurality of nodes based on the ray not intersecting the first primitive in the second frame. The temporal coherence component 198 may also be configured to update a cache at a graphics processing unit (GPU) or a memory at the GPU based on the storage of the first node ID for the first node, where the first frame is a previous frame in the set of frames and the second frame is a current frame in the set of frames, and where the first node is a cache node in the plurality of nodes. The temporal coherence component 198 may also be configured to output an indication of the storage of the first node ID for the first node or the re-performance of the ray traversal process for the second frame starting at the root node. The temporal coherence component 198 may also be configured to detect that the ray intersects a second primitive in the second frame corresponding to a second node in the plurality of nodes, where the second node includes a second node ID. The temporal coherence component 198 may also be configured to store at least one of the second node ID for the second node or a tHit value for the second node, where the tHit value for the second node is a previous distance at which the ray struck primitives associated with the second node. The temporal coherence component 198 may also be configured to perform, based on a first ray interval, a closest hit ray traversal process for a third frame in the set of frames starting at the root node, where the first ray interval is equal to a difference between a tMin value for a third node in the plurality of nodes and a tHit value for the third node, where the tMin value for the third node is a minimum distance from a ray origin point for the ray to strike primitives associated with the third node, and where the tHit value for the third node is a previous distance at which the ray struck the primitives associated with the third node. The temporal coherence component 198 may also be configured to detect whether the ray intersects a closest primitive in the third frame, where the closest primitive corresponds to a third node ID for the third node. The temporal coherence component 198 may also be configured to store the third node ID for the third node if the ray intersects the closest primitive in the third frame. The temporal coherence component 198 may also be configured to re-perform, based on a second ray interval, the closest hit ray traversal process for the third frame starting at the root node, where the second ray interval is equal to a difference between the tHit value for the third node and a tMax value for the third node, where the tMax value for the third node is a maximum distance from a ray origin point for the ray to strike primitives associated with the third node. The temporal coherence component 198 may also be configured to detect, based on the re-performance, that the ray intersects the closest primitive in the third frame; and store the third node ID for the third node based on the detection. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
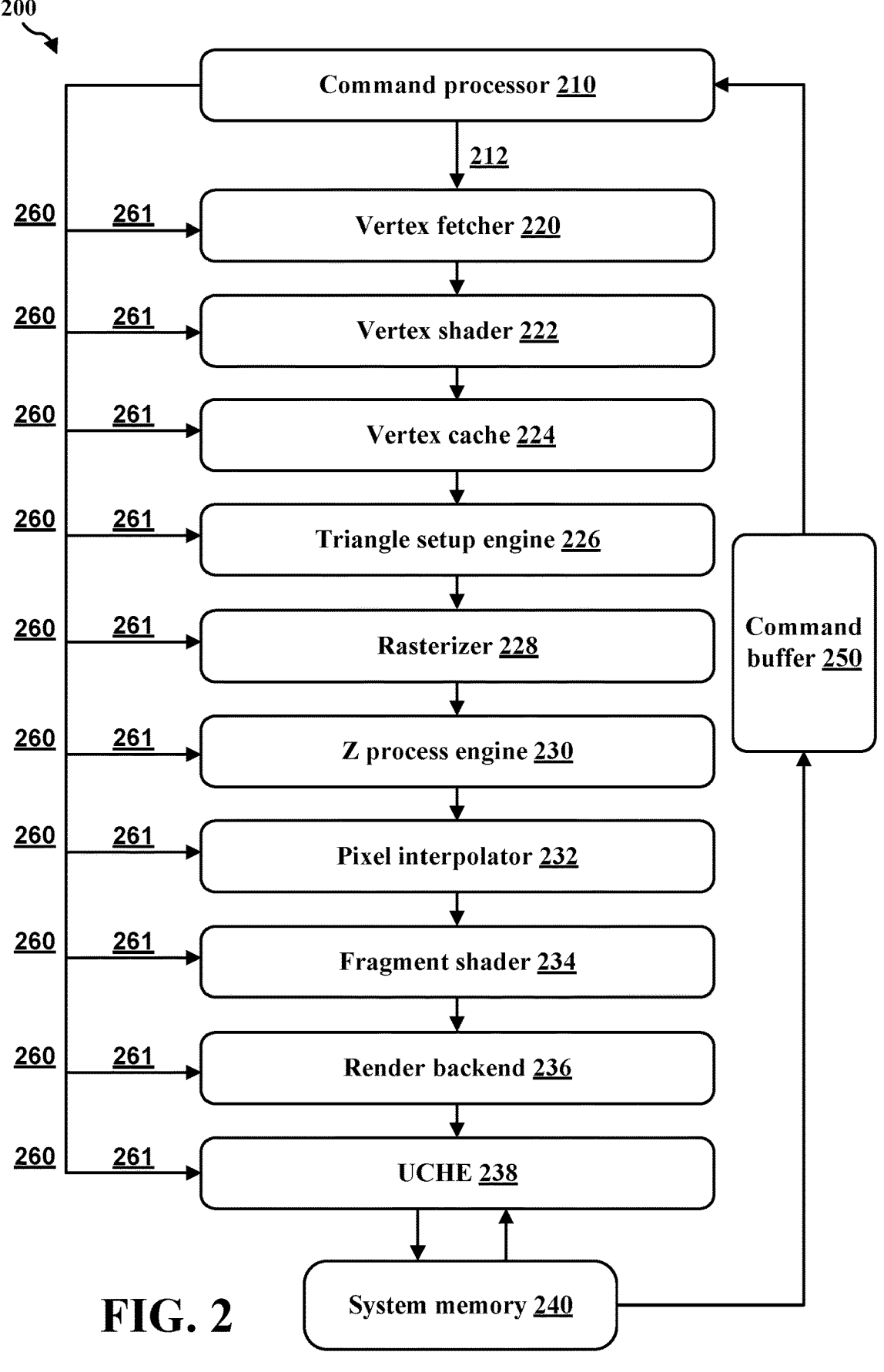
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce incredibly realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or strike a certain primitive, then the pixel is shaded. In some instances of graphics processing, ray tracing algorithms may be performed alongside rasterization, such as via a hybrid ray tracing/rasterization model.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or strike a certain primitive in scene object 460 corresponding to one of the pixels 470 via primary ray 484, then the pixel is shaded.

As indicated herein, the process of ray tracing may be performed by determining whether a ray will hit/strike any primitive(s) in a scene. For example, ray tracing algorithms may perform a simple query operation: Is a given ray going to hit/strike any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum distance from an origin point of the ray to strike primitives in a scene ($t_{min}$, tMin, or Tmin), a maximum distance from the origin point of the ray to strike primitives in a scene ($t_{max}$, tMax, or Tmax), and a calculated distance to strike primitives in the scene.

FIG. 5 illustrates diagram 500 including one example of a ray tracing process. As shown in FIG. 5, diagram 500 includes origin point for a ray (O(N) 510), a minimum distance from an origin point of the ray to strike primitives in a scene ($t_{min}$ 520), a maximum distance from the origin point of the ray to strike primitives in a scene ($t_{max}$ 522), a calculated distance to strike primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will strike a primitive, ray tracing techniques may utilize an origin point for a ray (O(N) 510), a minimum distance from the origin point of the ray to strike primitives ($t_{min}$ 520), a maximum distance from the origin point of the ray to strike primitives ($t_{max}$ 522), a calculated distance to strike primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal nodes may hold access aligned bounding boxes (AABBs) that enclose certain leaf node geometry. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log(N).

Figure 6B:
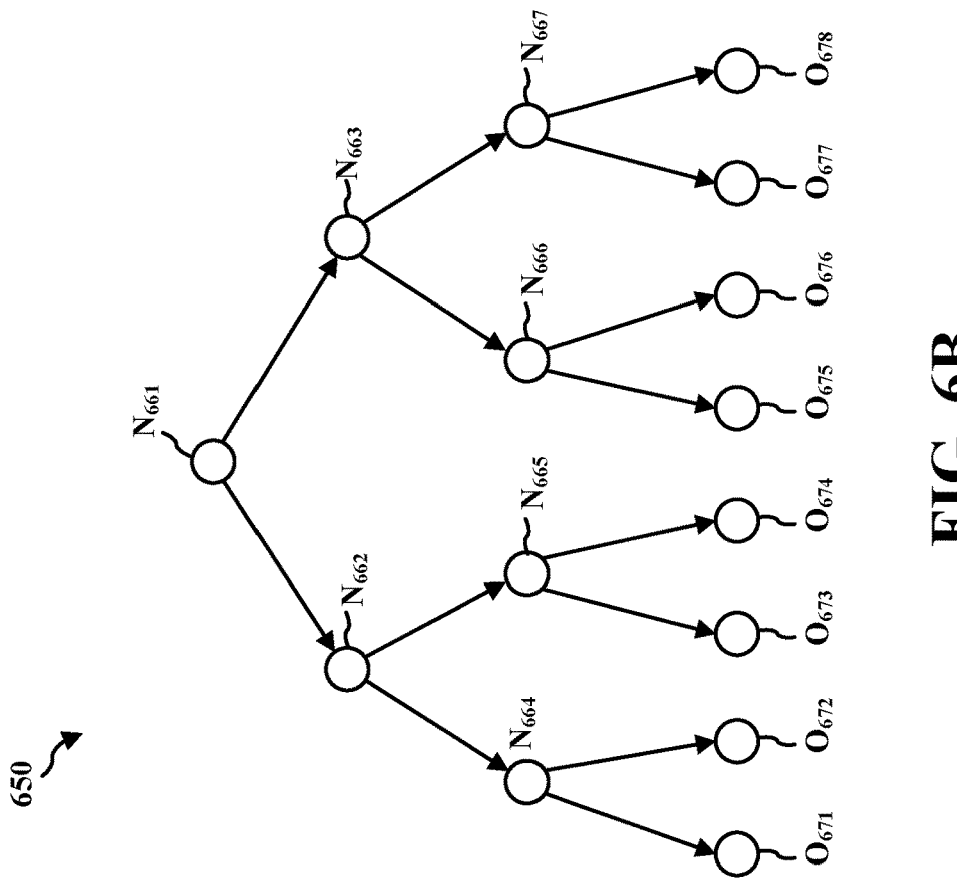
FIG. 6B is a diagram illustrating an example data structure.
Figure 6A:
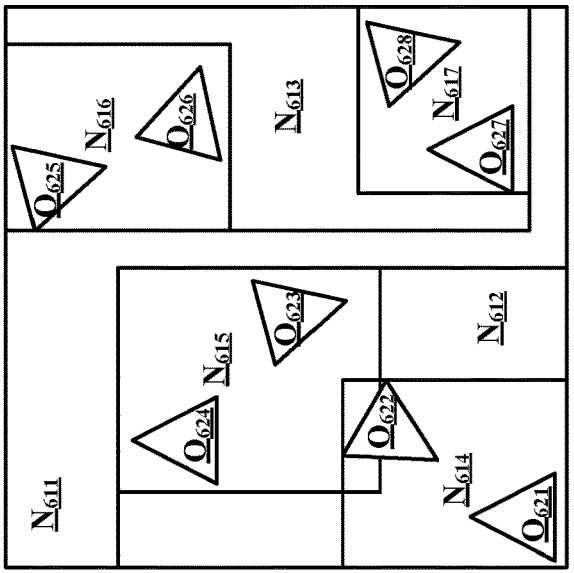
FIG. 6A is a diagram illustrating an example data structure.

FIGS. 6A and 6B illustrate diagram 600 and diagram 650, respectively, including example data structure techniques utilized in ray tracing. As shown in FIG. 6A, diagram 600 includes a number of nodes (internal nodes $N_{611}$-$N_{617}$) and a number of primitives (primitives $O_{621}$-$O_{628}$). FIG. 6A depicts a ray-box intersection for internal nodes $N_{611}$-$N_{617}$ and primitives $O_{621}$-$O_{628}$. As shown in FIG. 6B, diagram 650 includes a number of nodes (leaf nodes $N_{661}$-$N_{667}$) and a number of primitives (primitives $O_{671}$-$O_{678}$). FIG. 6B depicts a ray-triangle test for leaf nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \, \log \, n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (i.e., an initial BVH) to a wide BVH that is wider than the binary tree or initial BVH. For example, hierarchy in the initial BVH may include three levels, where the primitives are included in a third level of the hierarchy. The hierarchy in the wide BVH may include two levels, where the primitives are included in a second level of the hierarchy. In some instances of BVH widening, the wide BVH may include an internal node with a certain amount of AABBs (e.g., up to eight AABBs) and a leaf node with a certain amount of primitives/triangles (e.g., up to four primitives/triangles).

Figure 7B:
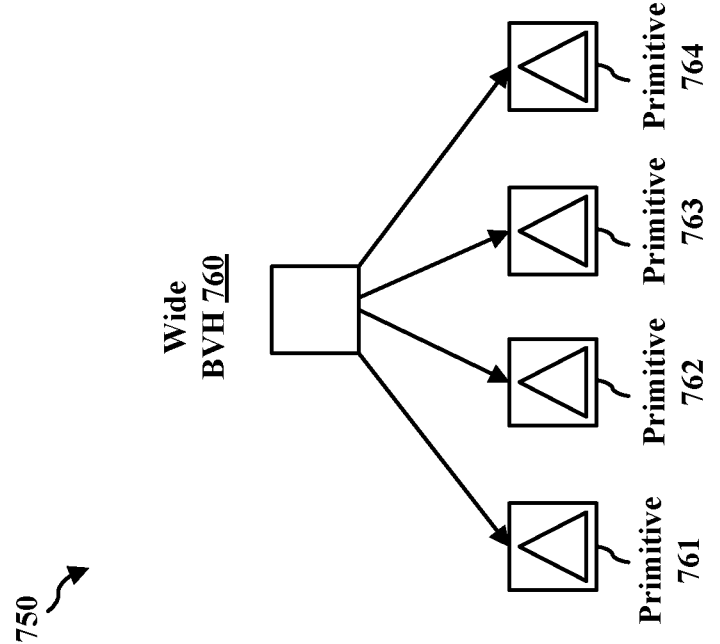
FIG. 7B is a diagram illustrating another example BVH.
Figure 7A:
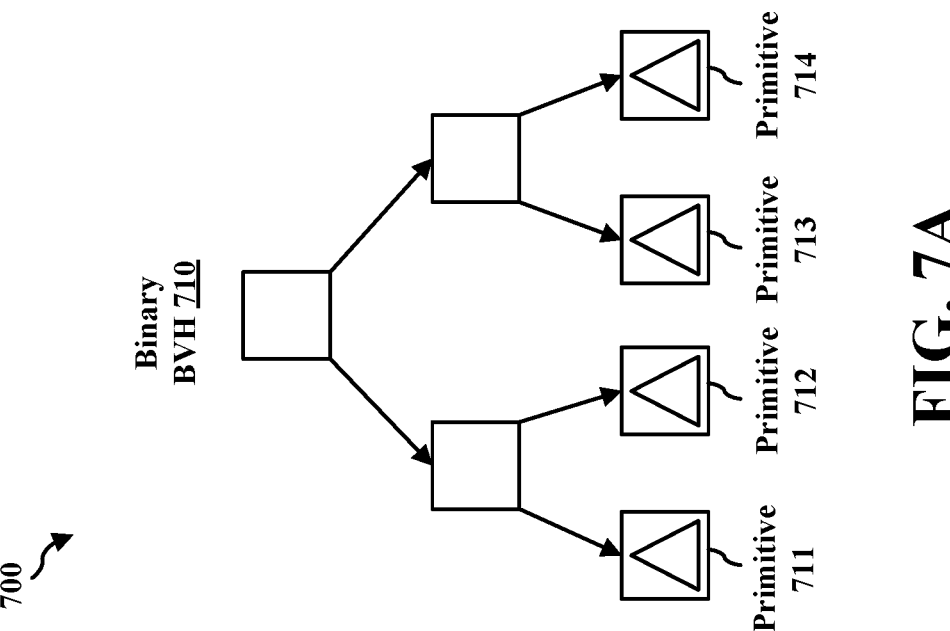
FIG. 7A is a diagram illustrating an example bounding volume hierarchy (BVH).

FIGS. 7A and 7B illustrate diagram 700 and diagram 750 including a binary bounding volume hierarchy and a wide bounding volume hierarchy, respectively. As shown in FIG. 7A, diagram 700 includes a binary bounding volume hierarchy 710 including primitive 711, primitive 712, primitive 713, and primitive 714. FIG. 7A depicts that binary bounding volume hierarchy 710 includes three levels, where primitives 711-714 are in the third level of the hierarchy. As shown in FIG. 7B, diagram 750 includes a wide bounding volume hierarchy 760 including primitive 761, primitive 762, primitive 763, and primitive 764. FIG. 7B depicts that wide bounding volume hierarchy 760 includes two levels, where primitives 761-764 are in the second level of the hierarchy. As shown in FIGS. 7A and 7B, binary bounding volume hierarchy 710 may undergo a process of bounding volume hierarchy widening that results in wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/ CPU hardware or software. For instance, in certain stages, a driver may construct the BVH on a CPU or GPU (e.g., a BVH construction stage and a BVH node compression stage). In a BVH traversal stage, the BVH traversal may occur in the shader at the GPU. Also, certain stages may be implemented in the GPU hardware (e.g., a BVH node decompression stage, a ray-bounding box intersection stage, and a ray-triangle intersection stage).

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). An acceleration structure or BVH structure is a tree structure including multiple nodes (e.g., a binary tree structure or a n-ary tree structure), where primitive data is stored in leaf nodes (i.e., the nodes in the branches of the tree structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. For example, for some scenes, a BVH structure associated with the scene may hold a large number of primitives (e.g., millions of primitives).

Bounding volume hierarchies and similar data structures are an efficient manner in which to store the geometry data for accelerating ray tracing performance. Although binary BVHs with a single primitive in a leaf node and one bounding box in an internal node may be helpful to improve ray tracing performance, increasing the width of BVHs to certain levels may improve the performance of ray tracing at a GPU. For example, increasing the width of BVHs to certain levels (e.g., an 8-wide BVH with up to 8 child nodes and up to 4 primitives in leaf nodes) based on surface area heuristics (SAH) may improve the performance of ray tracing at a GPU.

Figure 8:
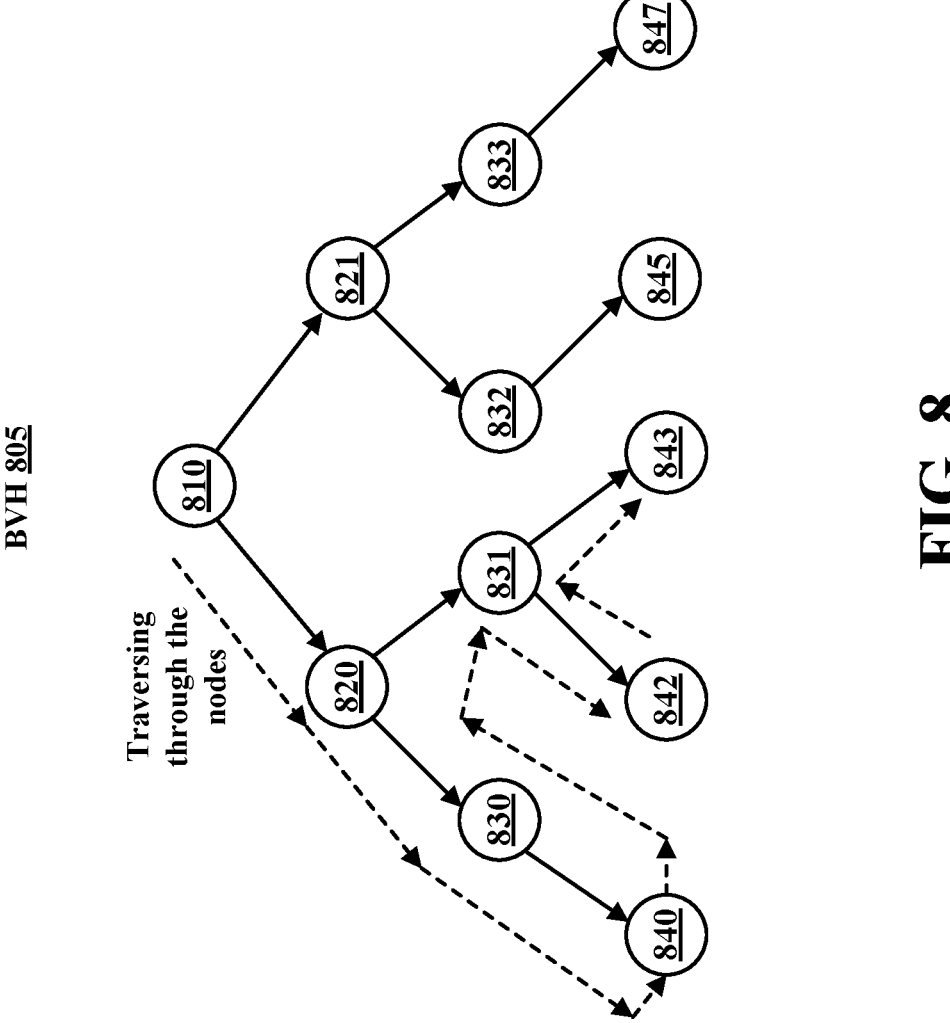
FIG. 8 is a diagram illustrating another example BVH.

FIG. 8 illustrates diagram 800 including one example of a bounding volume hierarchy (BVH). More specifically, diagram 800 depicts a traversal through a BVH including a plurality of nodes. As shown in FIG. 8, diagram 800 includes BVH 805 with multiple levels of nodes including node 810, node 820, node 821, node 830, node 831, node 832, node 833, node 840, node 842, node 843, node 845, and node 847. FIG. 8 also depicts an example order to traverse through the nodes in BVH 805. That is, the dotted arrow in FIG. 8 shows an example order of traversal. For example, the example order of traversal may be the following order: node 810, node 820, node 830, node 840, node 831, node 842, and node 843.

As shown in FIG. 8, ray tracing is a rendering technique used to generate images by tracing paths of light through a three-dimensional (3D) scene. In a typical ray tracing operation, multiple rays are transmitted per pixel through a bounding volume hierarchy (BVH). Also, ray triangle intersections are computed using acceleration structures (e.g., BVHs) that are built over primitives. With an increase in resolution and complex geometries, ray traversal is becoming very computationally intensive. Each ray may need to be intersected with multiple BVH nodes in order to reach a desired, final result. Also, every BVH tree hop or node may add memory accesses and additional arithmetic logic unit (ALU) operations for performing the intersections. Based on the above, it may be beneficial to reduce the amount of calculations and/or operations that are utilized for performing ray tracing operations. That is, it may be beneficial to reduce the amount of calculations and/or operations that are utilized for performing intersections during ray tracing. For instance, it may also be beneficial to reduce the total number of BVH tree hops utilized for completing a ray traversal process.

Aspects of the present disclosure may reduce the amount of calculations and/or operations that are utilized for performing ray tracing. For instance, aspects of the present disclosure may reduce the amount of calculations and/or operations that are utilized for performing intersections during ray tracing. In order to do so, aspects of the present disclosure may reduce the total number of BVH tree hops utilized for completing a ray traversal process. For example, aspects presented herein may reduce the total number of BVH tree hops or nodes utilized for completing a ray traversal process by utilizing temporal coherence. More specifically, aspects presented herein may reduce the total number of BVH tree hops or nodes by utilizing temporal coherence across frames. By utilizing temporal coherence across frames, aspects presented herein may reduce the amount of calculations and/or operations that are utilized for performing ray tracing. That is, by utilizing temporal coherence across frames, aspects presented herein may reduce the amount of memory accesses and additional arithmetic logic unit (ALU) operations for performing the intersections in ray tracing. Also, by utilizing temporal coherence across frames, aspects presented herein may reduce the overall cost of the ray traversal process. Temporal coherence may refer to the correlation between frames that occur at different time instances (e.g., adjacent time instances) for performing ray tracing operations. For instance, temporal coherence across frames may refer to the correlation between adjacent frames for a ray traversal operation. In some aspects, a ray traversal process may identify and handle intersections between a ray and geometries in an acceleration structure.

In some instances, aspects presented herein may utilize coherency between frames in order to reduce the traversal overhead for each pixel. That is, aspects presented herein may utilize the temporal coherency between frames in order to reduce the traversal overhead. For some frames, aspects presented herein may avoid starting a ray traversal process from a root node. Aspects presented herein may utilize information for some frames (e.g., a cached result) in order to perform a ray traversal for other frames. For instance, aspects presented herein may start a ray traversal process for a current frame at a cached result of a previous frame. This approach is in contrast to starting a ray traversal process from the root node for each frame. Indeed, aspects presented herein may begin a ray traversal process for some frames at a previously-cached result (e.g., a previously-cached node), rather than starting at a root node for every frame. By doing so, aspects presented herein may reduce the amount of amount of calculations and/or operations for ray tracing.

Figure 9:
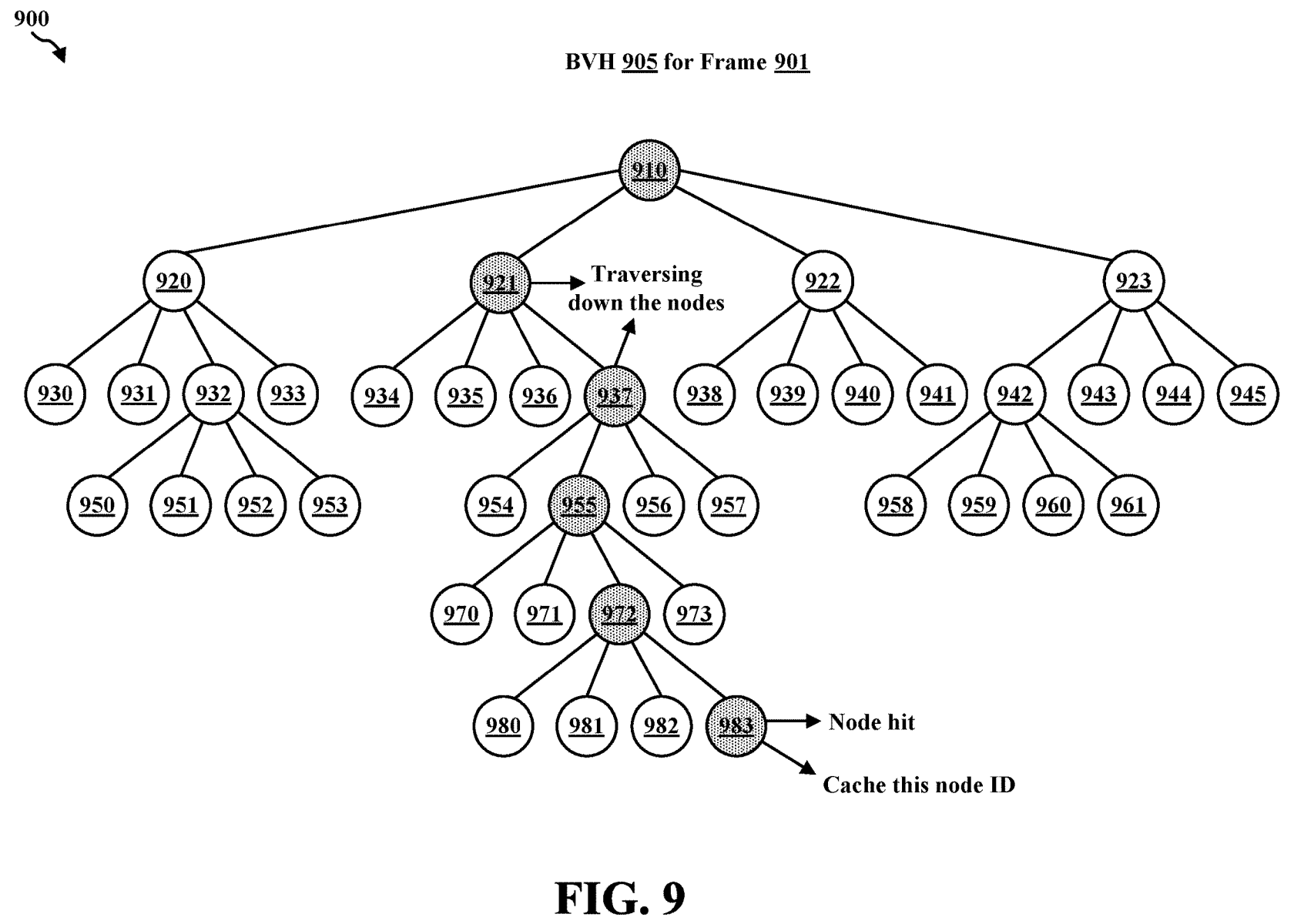

FIG. 9 illustrates diagram 900 including one example of a BVH for a ray traversal process. More specifically, diagram 900 depicts an example of traversing a BVH tree in order to reach a ray intersection result at a certain node in the tree. As shown in FIG. 9, diagram 900 includes BVH 905 with multiple levels of nodes including node 910, node 920, node 921, node 922, node 923, node 930, node 931, node 932, node 933, node 934, node 935, node 936, node 937, node 938, node 939, node 940, node 941, node 942, node 943, node 944, node 945, node 950, node 951, node 952, node 953, node 954, node 955, node 956, node 957, node 958, node 959, node 960, node 961, node 970, node 971, node 972, node 973, node 980, node 981, node 982, and node 983. Diagram 900 shows that aspects presented herein may traverse the BVH 905 and then store the traversal result for utilizing in a next frame. For instance, FIG. 9 shows the hops that may be needed to reach the node hit result (e.g., node 983).

FIG. 9 depicts an example order to traverse through the nodes in BVH 905 for a certain frame (e.g., frame 901). That is, the nodes including the dotted filling in FIG. 9 show an example order of traversal for BVH 905. Indeed, the spotted nodes signify the hops or path that the ray takes in order to reach the node hit (e.g., node 983), which is the result. For example, the example order of traversal for BVH 905 may be the following order: node 910, node 921, node 937, node 955, node 972, and node 983. As shown in FIG. 9, aspects presented herein may determine that node 983 corresponds to a node hit. Based on this node hit result, aspects presented herein may cache or store the node identifier (ID) for node 983 (e.g., node 983). This node ID (e.g., node 983) of the traversal result for the current frame (e.g., frame 901) may be cached or stored to utilize in the next frame (e.g., frame 902). For instance, aspects presented herein may cache the hit node (e.g., node 983) and save it in the memory or buffer. This information may be utilized in the next frames to reduce the amount of ray tracing operations.

Figure 10:
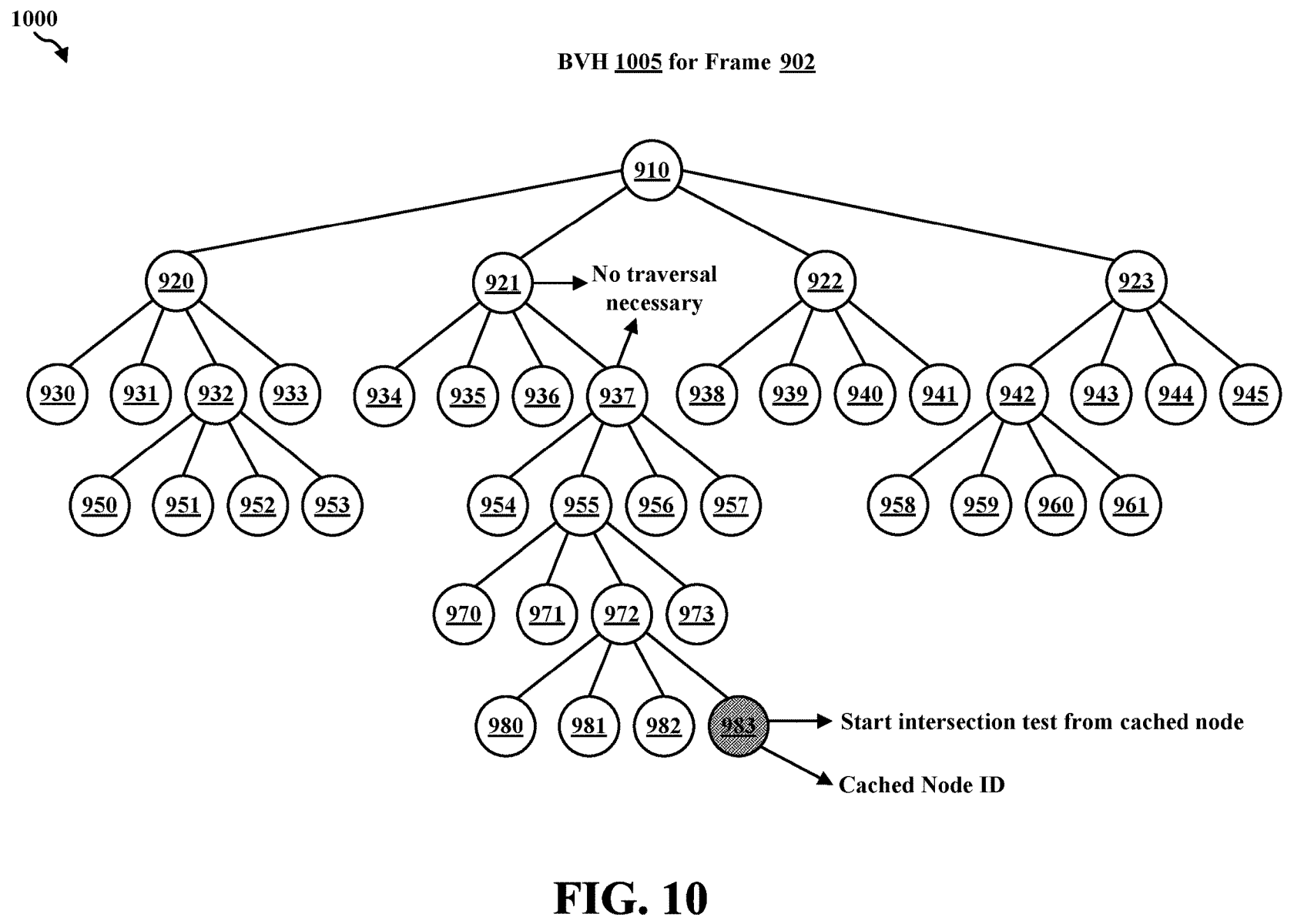

As shown in FIGS. 9 and 10, for the frame after the current frame (e.g., frame 902 after frame 901), the ray traversal process may not start from the root node, but rather the intersection test may be performed starting at the pre-viously-cache node in the memory or buffer. If the intersec-tion test results are positive for a certain node or if there is a node hit, aspects presented herein may start the traversal from the node corresponding to the node ID that is stored or cached in the memory/buffer. Indeed, if there is a node hit or the intersection test results are positive, aspects presented herein may utilize whatever information is stored from the previous frame without performing any calculations or operations. As such, if there is a node hit or the intersection test results are positive, aspects presented herein may utilize the previously-cached node ID and start the subsequent ray tracing operation at the corresponding hit node. By doing so, aspects of the present disclosure may reduce the amount of calculations and/or operations that are utilized for perform-ing ray tracing. Alternatively, if there is not a node hit or the intersection test results are negative, aspects presented herein may start from the top of the BVH tree (e.g., the root node) and perform the normal ray traversal process. Indeed, if there is a lack of a node hit, the subsequent node traversal operation may start at the root node, rather than the node that a corresponds to the previously-cached node ID. As utilized herein, a node "hit" may occur when a ray intersects with a triangle or primitive that corresponds to the node.

FIG. 10 illustrates diagram 1000 including one example of a BVH for a ray traversal process. More specifically, diagram 1000 depicts an example of starting a traversal of a BVH tree at a certain node or ray intersection result. As shown in FIG. 10, diagram 1000 includes BVH 1005 with multiple levels of nodes including node 910, node 920, node 921, node 922, node 923, node 930, node 931, node 932, node 933, node 934, node 935, node 936, node 937, node 938, node 939, node 940, node 941, node 942, node 943, node 944, node 945, node 950, node 951, node 952, node 953, node 954, node 955, node 956, node 957, node 958, node 959, node 960, node 961, node 970, node 971, node 972, node 973, node 980, node 981, node 982, and node 983. As shown in FIG. 10, BVH 1005 includes a similar node structure as BVH 905 in FIG. 9.

As depicted in FIG. 10, diagram 1000 shows that aspects presented herein may start a traversal of BVH 1005 at a certain node (e.g., node 983) or ray intersection result. That is, aspects presented herein may start an intersection test for a ray tracing operation at a node corresponding to a previ-ously-cached node ID (e.g., node 983). As such, if the intersection test results are positive for a certain node or if there is a node hit, there may be no need to traverse the BVH tree from the root node. For instance, if the intersection test results are positive for a certain node or if there is a node hit, aspects presented herein may start the traversal from the node corresponding to the node ID that is stored or cached in the memory/buffer (e.g., node 983). As shown in FIG. 10, if the intersection test results are positive or if there is a node hit, aspects presented herein may utilize the previously-cached node ID (e.g., node 983) and start the subsequent ray tracing operation at the corresponding hit node. Indeed, as depicted in FIG. 10, if the ray and its corresponding BVH node matches, aspects presented herein may avoid the entire traversal loop for the BVH tree and start the subsequent ray tracing operation at the corresponding hit node. By doing so, aspects of the present disclosure may reduce the amount of calculations and/or operations that are utilized for perform-ing ray tracing.

As shown in FIGS. 9 and 10, aspects presented herein may perform a ray traversal process for a second frame (e.g., frame 902) in a set of frames starting at a first node (e.g., node 983) in a plurality of nodes, where a ray in the ray traversal process previously intersected a first primitive in a first frame (e.g., primitive corresponding to node 983 in frame 901), where the first primitive corresponds to a first node ID for the first node (e.g., node 983), and where the second frame (e.g., frame 902) is subsequent to the first frame (e.g., frame 901) in the set of frames. Aspects pre-sented herein may also, detect whether the ray intersects the first primitive in the second frame, where the first primitive corresponds to the first node ID for the first node (e.g., node 983). Also, aspects presented herein may store the first node ID for the first node (e.g., node 983) based on the ray intersecting the first primitive in the second frame (e.g., frame 902), or re-perform the ray traversal process for the second frame (e.g., frame 902) starting at a root node (e.g., node 91) in the plurality of nodes based on the ray not intersecting the first primitive in the second frame (e.g., frame 902).

As further shown in FIGS. 9 and 10, aspects presented herein may detect that the ray intersects a second primitive in the second frame (e.g., frame 902) corresponding to a second node in the plurality of nodes, where the second node includes a second node ID. Aspects presented herein may also store at least one of the second node ID for the second node or a tHit value for the second node, where the tHit value for the second node is a previous distance at which the ray struck primitives associated with the second node. Also, a t range value for the second node may be equal to a difference between a tMax value (or Tmax value) for the second node and a tMin value (or Tmin value) for the second node, where the tMax value for the second node is a maximum distance from a ray origin point for the ray to strike primitives associated with the second node, and where the tMin value for the second node is a minimum distance from a ray origin point for the ray to strike the primitives associated with the second node.

FIG. 11 illustrates diagram 1100 including one example of a flowchart for a ray tracing operation. More specifically, diagram 1100 depicts a flowchart for a ray tracing operation when utilizing any hit use case. As shown in FIG. 11, diagram 1100 includes steps (e.g., step 1102, step 1104, step 1106, step 1108, and step 1110) explaining a ray traversal operation for an any hit node use case. As depicted in FIG. 11, at step 1102, aspects presented herein may check a cached node ID for a hit. At step 1104, aspects presented herein may determine if a cached node ID is a hit. At step 1106, if the cached node ID is not a hit, aspects presented herein may start a traversal from a root node. Also, if the cached node ID is not a hit, at step 1108, aspects presented herein may store the node ID if there is a subsequent hit. If there is a cached node ID hit at 1104, at step 1110, aspects presented herein may exit the traversal and pass the node ID as a hit result.

As shown in FIG. 11, the flowchart in diagram 1100 illustrates the steps explaining a ray traversal operation for an "any hit node" use case. In an "any hit node" use case, aspects presented herein may accept the first hit and then end the search (e.g., ACCEPT_FIRST_HIT_AND_END-_SEARCH). This use case may be set for shadow rays where aspects presented herein may be looking for the existence of an occluder (e.g., an occluding object) and not the closest hit node. For instance, FIG. 11 depicts the steps for rays with a certain flag set (e.g., an ACCEPT_FIRST_HIT_AND-_END_SEARCH flag set). This flag may be set for shadow rays that are looking for any occluder and not a closest hit. As shown in FIG. 11, first, aspects presented herein may cache the node IDs which are a hit for each pixel. These cached node IDs may then be used as the starting point for ray triangle intersection in the next frame. If the test is positive for the cached node ID, aspects presented herein may use the same result for a current frame, else aspects presented herein may go back to the root node and start the traversal from the top of the BVH tree. Additionally, for the cases where a certain flag is not set (e.g., an ACCEPT-_FIRST_HIT_AND_END_SEARCH flag is not set), aspects presented herein may update a certain number of values (e.g., t values) of the ray and start the ray traversal from the root node. The ray with the updated number of values (e.g., t values) may incur a reduced number of hops.

Figure 12:
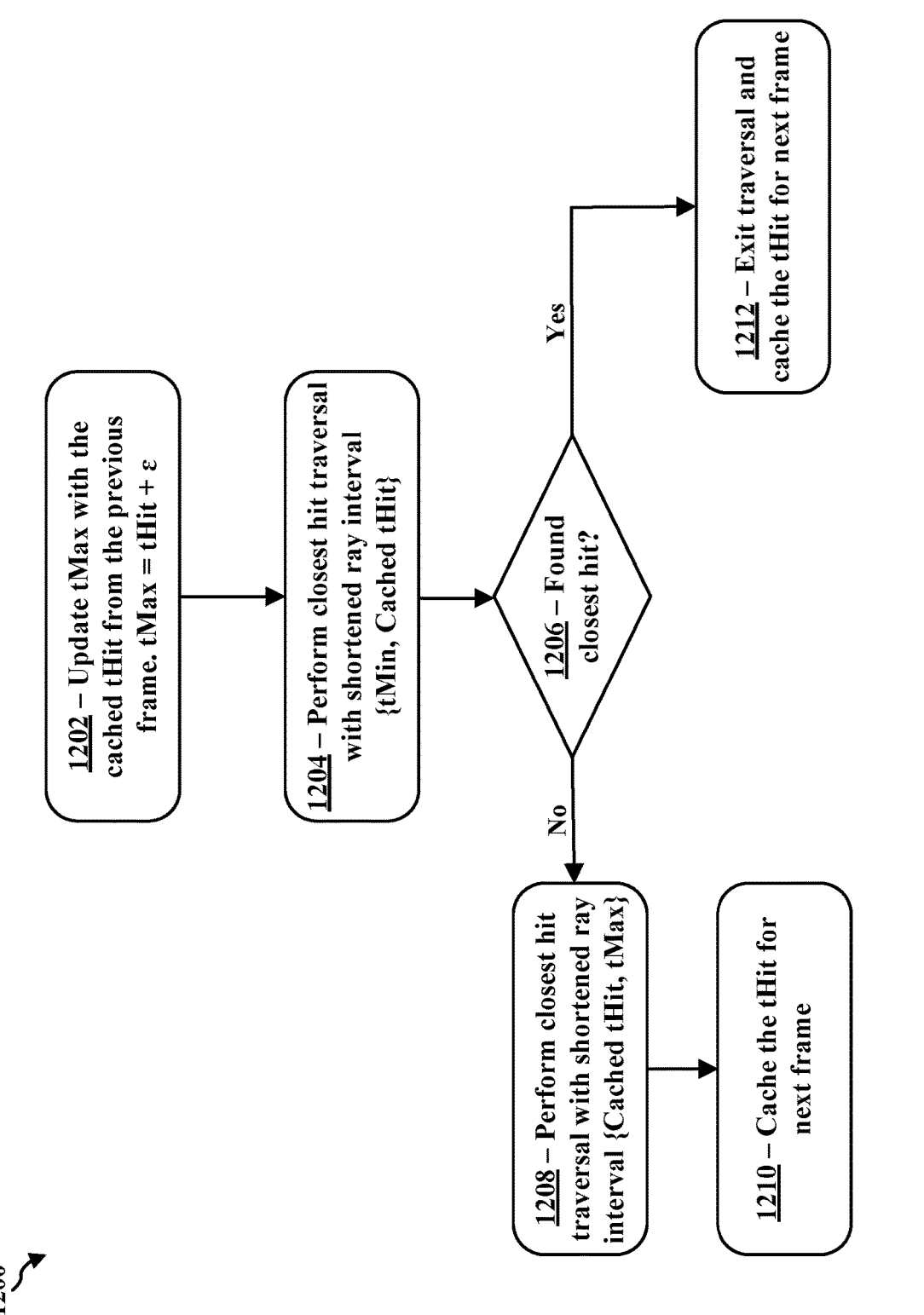
FIG. 12 is a diagram illustrating an example of a flowchart for a ray tracing operation.

FIG. 12 illustrates diagram 1200 including one example of a flowchart for a ray tracing operation. More specifically, diagram 1200 depicts a flowchart for a ray tracing operation when utilizing a closest hit use case. As shown in FIG. 12, diagram 1200 includes steps (e.g., step 1202, step 1204, step 1206, step 1208, step 1210, and step 1212) explaining a ray traversal operation for a closest hit node use case. As depicted in FIG. 12, at step 1202, aspects presented herein may update a tMax value with the cached tHit value from the previous frame, where tMax=tHit+ε, where ε is a constant. The tHit value for a node may be a previous distance at which the ray struck the primitives associated with the hit node, the tMax value for the node may be a maximum distance from a ray origin point for the ray to strike primitives associated with the node, and the tMin value for the node may be a minimum distance from a ray origin point for the ray to strike primitives associated with the node. At step 1204, aspects presented herein may perform a closest hit traversal with a shortened ray interval (e.g., {tMin, Cached tHit}). At step 1206, aspects presented herein may determine if a closest hit is found. At step 1208, if the closest hit is not found, aspects presented herein may perform a closest hit traversal with a shortened ray interval (e.g., {Cached tHit, tMax}). At step 1210, if the closest hit is not found, aspects presented herein may cache the tHit value for the next frame. If the closest hit is found, at step 1212, aspects presented herein may exit the traversal and cache the tHit value for the next frame.

As shown in FIG. 12, the flowchart in diagram 1200 illustrates the steps explaining a ray traversal operation for a "closest hit" use case. In a "closest hit" use case, aspects presented herein may search until a closest hit node is found. For instance, aspects presented herein may cache the tHit value from the previous frame for each pixel. By doing so, aspects presented herein may be limiting the number of hops by shortening the ray. In a best case scenario for the "closest hit" use case, aspects presented herein may traverse a shortened ray with a fewer number of hops. In a worst case scenario for the "closest hit" use case, aspects presented herein may traverse two rays whose total length is the same as the original ray. The total amount of hops in the worst case scenario may be slightly higher than the original ray, but this scenario will occur infrequently. For example, in a use case with four hits, aspects presented herein may return the closest of the four hits, and then modify the algorithm such that instead of caching the node ID from the previous frame, aspects presented herein may cache the hit node. By doing so, aspects presented herein may reduce the actual length of the ray. For instance, with the original tMin value and the cache tHit, aspects presented herein may check for the closest hit. If the closest hit is returned, aspects presented herein may end the traversal and then cache hit for the next frame. If the closest hit is not returned, aspects presented herein may perform one more closest hit.

As shown in FIG. 12, at step 1204, aspects presented herein may perform, based on a first ray interval, a closest hit ray traversal process for a third frame in the set of frames starting at the root node, where the first ray interval is equal to a difference between a tMin value for a third node in the plurality of nodes and a tHit value for the third node, where the tMin value for the third node is a minimum distance from a ray origin point for the ray to strike primitives associated with the third node, and where the tHit value for the third node is a previous distance at which the ray struck the primitives associated with the third node. At step 1206, aspects presented herein may detect whether the ray intersects a closest primitive in the third frame, where the closest primitive corresponds to a third node ID for the third node. At step 1208, aspects presented herein may re-perform, based on a second ray interval, the closest hit ray traversal process for the third frame starting at the root node, where the second ray interval is equal to a difference between the tHit value for the third node and a tMax value for the third node, where the tMax value for the third node is a maximum distance from a ray origin point for the ray to strike primitives associated with the third node. At step 1210, aspects presented herein may detect, based on the re-performance, that the ray intersects the closest primitive in the third frame; and store the third node ID for the third node based on the detection. At step 1212, aspects presented herein may store the third node ID for the third node if the ray intersects the closest primitive in the third frame.

In one example, aspects presented herein performed an analysis of shadow rays from 15 consecutive frames. It was observed a ray hit was obtained using the cached node IDs of previous frame a certain amount of time (e.g., 92% of the time). This results in a reduction (e.g., ~80% reduction) in the overall hop count per frame. In another example, aspects presented herein may utilize a series of frames where the scene is changing. In that case, utilizing one frame may result in a certain reduction (e.g., ~48% reduction) in hop count and utilizing other frames may result another reduction (e.g., ~80% reduction) in hop count.

Aspects presented herein may also utilize an additional memory condition or specification. For an any hit use case, for intersecting a ray in current frame with a BVH node queried from the previous frame's ray traversal of the same pixel, aspects presented herein may store its node ID, a corresponding bottom-level acceleration structure (BLAS) ID. This may utilize the transforms necessary for transforming the ray from world space to local space. For a closest hit use case, aspects presented herein may store the tHit value. This information may be stored per pixel per ray. Also, aspects presented herein may reduce the information being stored and still see considerable improvements in the traversal performance. For instance, to reduce the storage cost, aspects presented herein may skip storing the BLAS node ID and store the BLAS tree information. This way, aspects presented herein may be able to skip the top-level acceleration structure (BLAS) tree traversal and start the traversal from the BLAS tree itself. This may also significantly save the tree hops from the ray traversal. Aspects presented herein may also store the t values of the ray per pixel. For example, starting the ray traversal with updated t values may help with reducing the unnecessary node intersections for achieving the closest hit.

Aspects presented herein relate to ray tracing using, e.g., acceleration structures (BVHs) built over primitives. With an increase in resolution and complex geometries, this technique is becoming more compute intensive. Each ray may need to be intersected with multiple BVH nodes to reach the final result. Every BVH tree hop adds memory accesses and additional ALU operations for performing the intersections. Aspects presented herein propose to reduce the total number of BVH tree hops for completing the ray traversal by utilizing the temporal coherence across frames. In particular, Aspects presented herein may cache the node-IDs which are a hit for each pixel, which are then used as the starting point for ray triangle intersection in the next frame. In one example, a reduction (e.g., ~80% reduction) in the overall hop count per frame may be achieved.

Aspects of the present disclosure may include a number of benefits or advantages. For instance, aspects of the present disclosure may reduce the amount of calculations and/or operations that are utilized for performing ray tracing. In order to do so, aspects of the present disclosure may reduce the total number of BVH tree hops utilized for completing a ray traversal process. Additionally, aspects presented herein may reduce the total number of BVH tree hops or nodes by utilizing temporal coherence across frames. By utilizing temporal coherence across frames, aspects presented herein may reduce the amount of calculations and/or operations that are utilized for performing ray tracing. That is, by utilizing temporal coherence across frames, aspects presented herein may reduce the amount of memory accesses and additional ALU operations for performing the intersections in ray tracing. Also, by utilizing temporal coherence across frames, aspects presented herein may reduce the overall cost of the ray traversal process.

FIG. 13 is a communication flow diagram 1300 of graphics processing in accordance with one or more techniques of this disclosure. As shown in FIG. 13, diagram 1300 includes example communications between a GPU 1302 (or other graphics processor), CPU 1304 (or other central processor)

or another GPU component, and memory 1306 (e.g., GMEM or SYSMEM), in accordance with one or more techniques of this disclosure.

At 1310, GPU 1302 may configure a bounding volume hierarchy (BVH) for the ray traversal process. At 1310, GPU 1302 may also perform the ray traversal process for the first frame starting at the root node in the plurality of nodes, where the BVH includes the plurality of nodes, and where each node in the plurality of nodes corresponds to at least one primitive in a plurality of primitives in the set of frames. At 1310, GPU 1302 may detect that the ray in the ray traversal process intersects the first primitive in the first frame corresponding to the first node in the plurality of nodes, where the first node includes the first node ID. At 1310, GPU 1302 may store at least one of the first node ID for the first node or a tHit value for the first node, where the tHit value for the first node is a previous distance at which the ray struck primitives associated with the first node. In some aspects, storing at least one of the first node ID for the first node or the tHit value for the first node may comprise storing at least one of the first node ID for the first node or the tHit value for the first node in a system memory (SMEM) or a graphics memory (GMEM). Also, in some instances, each node may correspond to a bounding volume for the plurality of primitives or a bounding box for the plurality of primitives, where the ray may comprise a plurality of rays, and where performing the ray traversal process for the first frame may comprise performing the ray traversal process for the first frame via the plurality of rays.

At 1320, GPU 1302 may perform a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames.

At 1330, GPU 1302 may detect whether the ray intersects the first primitive in the second frame.

At 1340, GPU 1302 may store the first node ID for the first node based on the ray intersecting the first primitive in the second frame, or re-perform the ray traversal process for the second frame starting at a root node in the plurality of nodes based on the ray not intersecting the first primitive in the second frame.

At 1350, GPU 1302 may update a cache at a graphics processing unit (GPU) or a memory at the GPU based on the storage of the first node ID for the first node, where the first frame is a previous frame in the set of frames and the second frame is a current frame in the set of frames, and where the first node is a cache node in the plurality of nodes.

At 1360, GPU 1302 may output an indication of the storage of the first node ID for the first node or the re-performance of the ray traversal process for the second frame starting at the root node. In some aspects, outputting the indication may comprise transmitting the indication of the storage of the first node ID for the first node or the re-performance of the ray traversal process for the second frame starting at the root node; or storing the indication of the storage the first node ID for the first node or the re-performance of the ray traversal process for the second frame starting at the root node. As such, the GPU 1302 may transmit the indication (e.g., indication 1362) of the storage of the first node ID for the first node or the re-performance of the ray traversal process for the second frame starting at the root node; or store the indication (e.g., indication 1364) of the storage the first node ID for the first node or the re-performance of the ray traversal process for the second frame starting at the root node.

At 1370, GPU 1302 may detect that the ray intersects a second primitive in the second frame corresponding to a second node in the plurality of nodes, where the second node includes a second node ID. At 1370, GPU 1302 may also store at least one of the second node ID for the second node or a tHit value for the second node, where the tHit value for the second node is a previous distance at which the ray struck primitives associated with the second node. Also, a t range value for the second node may be equal to a difference between a tMax value for the second node and a tMin value for the second node, where the tMax value for the second node is a maximum distance from a ray origin point for the ray to strike primitives associated with the second node, and where the tMin value for the second node is a minimum distance from a ray origin point for the ray to strike the primitives associated with the second node. In some aspects, storing at least one of the second node ID for the second node or the tHit value for the second node may comprise storing at least one of the second node ID for the second node or the tHit value for the second node in a system memory (SMEM) or a graphics memory (GMEM).

At 1380, GPU 1302 may perform, based on a first ray interval, a closest hit ray traversal process for a third frame in the set of frames starting at the root node, where the first ray interval is equal to a difference between a tMin value for a third node in the plurality of nodes and a tHit value for the third node, where the tMin value for the third node is a minimum distance from a ray origin point for the ray to strike primitives associated with the third node, and where the tHit value for the third node is a previous distance at which the ray struck the primitives associated with the third node. At 1380, GPU 1302 may also detect whether the ray intersects a closest primitive in the third frame, where the closest primitive corresponds to a third node ID for the third node. At 1380, GPU 1302 may also store the third node ID for the third node if the ray intersects the closest primitive in the third frame. At 1380, GPU 1302 may also re-perform, based on a second ray interval, the closest hit ray traversal process for the third frame starting at the root node, where the second ray interval is equal to a difference between the tHit value for the third node and a tMax value for the third node, where the tMax value for the third node is a maximum distance from a ray origin point for the ray to strike primitives associated with the third node. At 1380, GPU 1302 may also detect, based on the re-performance, that the ray intersects the closest primitive in the third frame; and store the third node ID for the third node based on the detection.

Figure 14:
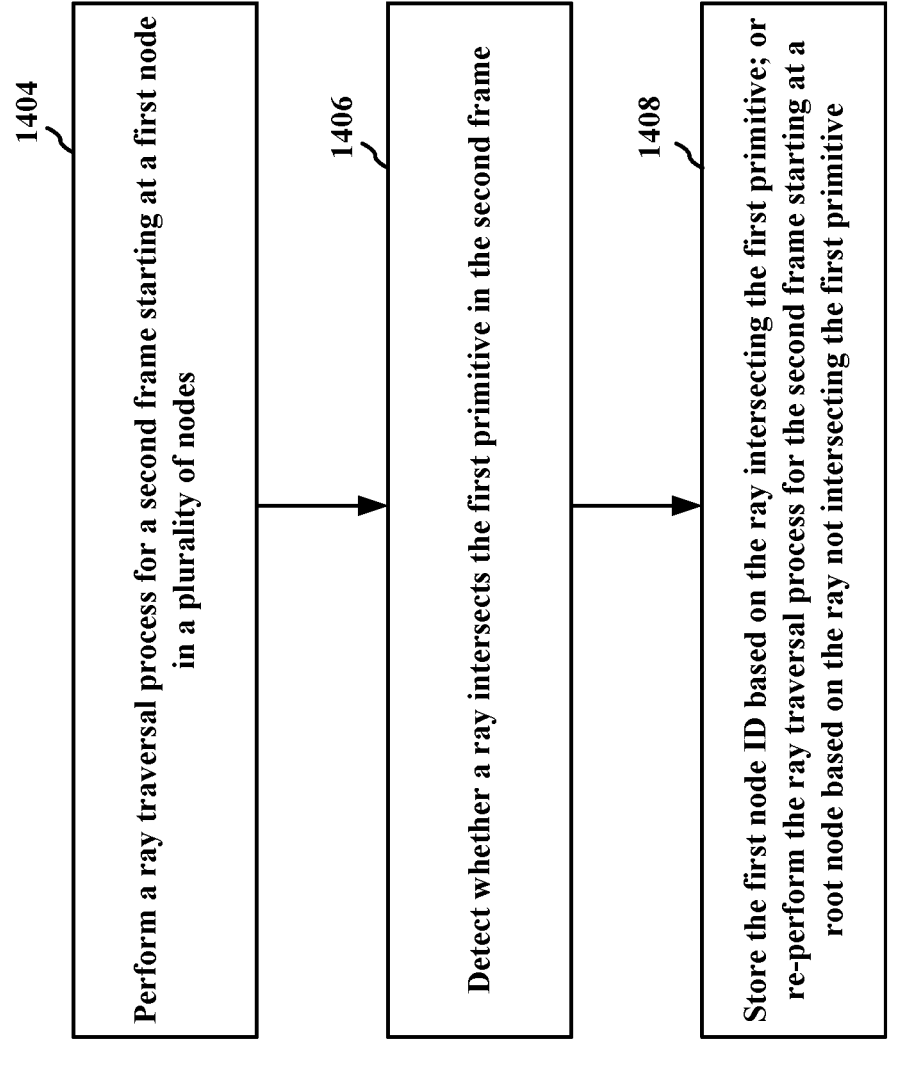
FIG. 14 is a flowchart of an example method of graphics processing.

FIG. 14 is a flowchart 1400 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-13. The methods described herein may provide a number of benefits, such as improving resource utilization and/or power savings.

At 1404, the GPU may perform a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames, as described in connection with the examples in FIGS. 1-13. For example, as described in 1320 of FIG. 13, GPU 1302 may perform a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames. Further, step 1404 may be performed by processing unit 120 in FIG. 1.

At 1406, the GPU may detect whether the ray intersects the first primitive in the second frame, as described in connection with the examples in FIGS. 1-13. For example, as described in 1330 of FIG. 13, GPU 1302 may detect whether the ray intersects the first primitive in the second frame. Further, step 1406 may be performed by processing unit 120 in FIG. 1.

At 1408, the GPU may store the first node ID for the first node based on the ray intersecting the first primitive in the second frame, or re-perform the ray traversal process for the second frame starting at a root node in the plurality of nodes based on the ray not intersecting the first primitive in the second frame, as described in connection with the examples in FIGS. 1-13. For example, as described in 1340 of FIG. 13, GPU 1302 may store the first node ID for the first node based on the ray intersecting the first primitive in the second frame, or re-perform the ray traversal process for the second frame starting at a root node in the plurality of nodes based on the ray not intersecting the first primitive in the second frame. Further, step 1408 may be performed by processing unit 120 in FIG. 1.

FIG. 15 is a flowchart 1500 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-13. The methods described herein may provide a number of benefits, such as improving resource utilization and/or power savings.

At 1502, the GPU may configure a bounding volume hierarchy (BVH) for the ray traversal process, as described in connection with the examples in FIGS. 1-13. For example, as described in 1310 of FIG. 13, GPU 1302 may configure a bounding volume hierarchy (BVH) for the ray traversal process. Further, step 1502 may be performed by processing unit 120 in FIG. 1. At 1502, the GPU may also perform the ray traversal process for the first frame starting at the root node in the plurality of nodes, where the BVH includes the plurality of nodes, and where each node in the plurality of nodes corresponds to at least one primitive in a plurality of primitives in the set of frames, as described in connection with the examples in FIGS. 1-13. For example, as described in 1310 of FIG. 13, GPU 1302 may perform the ray traversal process for the first frame starting at the root node in the plurality of nodes, where the BVH includes the plurality of nodes, and where each node in the plurality of nodes corresponds to at least one primitive in a plurality of primitives in the set of frames. Further, step 1502 may be performed by processing unit 120 in FIG. 1. At 1502, the GPU may detect that the ray in the ray traversal process intersects the first primitive in the first frame corresponding to the first node in the plurality of nodes, where the first node includes the first node ID, as described in connection with the examples in FIGS. 1-13. For example, as described in 1310 of FIG. 13, GPU 1302 may detect that the ray in the ray traversal process intersects the first primitive in the first frame corresponding to the first node in the plurality of nodes, where the first node includes the first node ID. Further, step 1502 may be performed by processing unit 120 in FIG. 1. At 1502, the GPU may store at least one of the first node ID for the first node or a tHit value for the first node, where the tHit value for the first node is a previous distance at which the ray struck primitives associated with the first node, as described in connection with the examples in FIGS. 1-13. For example, as described in 1310 of FIG. 13, GPU 1302 may store at least one of the first node ID for the first node or a tHit value for the first node, where the tHit value for the first node is a previous distance at which the ray struck primitives associated with the first node. Further, step 1502 may be performed by processing unit 120 in FIG. 1. In some aspects, storing at least one of the first node ID for the first node or the tHit value for the first node may comprise storing at least one of the first node ID for the first node or the tHit value for the first node in a system memory (SMEM) or a graphics memory (GMEM). Also, in some instances, each node may correspond to a bounding volume for the plurality of primitives or a bounding box for the plurality of primitives, where the ray may comprise a plurality of rays, and where performing the ray traversal process for the first frame may comprise performing the ray traversal process for the first frame via the plurality of rays.

At 1504, the GPU may perform a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames, as described in connection with the examples in FIGS. 1-13. For example, as described in 1320 of FIG. 13, GPU 1302 may perform a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames. Further, step 1504 may be performed by processing unit 120 in FIG. 1.

At 1506, the GPU may detect whether the ray intersects the first primitive in the second frame, as described in connection with the examples in FIGS. 1-13. For example, as described in 1330 of FIG. 13, GPU 1302 may detect whether the ray intersects the first primitive in the second frame. Further, step 1506 may be performed by processing unit 120 in FIG. 1.

At 1508, the GPU may store the first node ID for the first node based on the ray intersecting the first primitive in the second frame, or re-perform the ray traversal process for the second frame starting at a root node in the plurality of nodes based on the ray not intersecting the first primitive in the second frame, as described in connection with the examples in FIGS. 1-13. For example, as described in 1340 of FIG. 13, GPU 1302 may store the first node ID for the first node based on the ray intersecting the first primitive in the second frame, or re-perform the ray traversal process for the second frame starting at a root node in the plurality of nodes based on the ray not intersecting the first primitive in the second frame. Further, step 1508 may be performed by processing unit 120 in FIG. 1.

At 1510, the GPU may update a cache at a graphics processing unit (GPU) or a memory at the GPU based on the storage of the first node ID for the first node, where the first frame is a previous frame in the set of frames and the second frame is a current frame in the set of frames, and where the first node is a cache node in the plurality of nodes, as described in connection with the examples in FIGS. 1-13. For example, as described in 1350 of FIG. 13, GPU 1302 may update a cache at a graphics processing unit (GPU) or a memory at the GPU based on the storage of the first node ID for the first node, where the first frame is a previous frame in the set of frames and the second frame is a current frame in the set of frames, and where the first node is a cache node in the plurality of nodes. Further, step 1510 may be performed by processing unit 120 in FIG. 1.

At 1512, the GPU may output an indication of the storage of the first node ID for the first node or the re-performance of the ray traversal process for the second frame starting at the root node, as described in connection with the examples in FIGS. 1-13. For example, as described in 1360 of FIG. 13, GPU 1302 may output an indication of the storage of the first node ID for the first node or the re-performance of the ray traversal process for the second frame starting at the root node. Further, step 1512 may be performed by processing unit 120 in FIG. 1. In some aspects, outputting the indication may comprise transmitting the indication of the storage of the first node ID for the first node or the re-performance of the ray traversal process for the second frame starting at the root node; or storing the indication of the storage the first node ID for the first node or the re-performance of the ray traversal process for the second frame starting at the root node. As such, the GPU may transmit the indication (e.g., indication 1362) of the storage of the first node ID for the first node or the re-performance of the ray traversal process for the second frame starting at the root node; or store the indication (e.g., indication 1364) of the storage the first node ID for the first node or the re-performance of the ray traversal process for the second frame starting at the root node.

At 1514, the GPU may detect that the ray intersects a second primitive in the second frame corresponding to a second node in the plurality of nodes, where the second node includes a second node ID, as described in connection with the examples in FIGS. 1-13. For example, as described in 1370 of FIG. 13, GPU 1302 may detect that the ray intersects a second primitive in the second frame corresponding to a second node in the plurality of nodes, where the second node includes a second node ID. Further, step 1514 may be performed by processing unit 120 in FIG. 1. At 1514, the GPU may also store at least one of the second node ID for the second node or a tHit value for the second node, where the tHit value for the second node is a previous distance at which the ray struck primitives associated with the second node, as described in connection with the examples in FIGS. 1-13. For example, as described in 1370 of FIG. 13, GPU 1302 may store at least one of the second node ID for the second node or a tHit value for the second node, where the tHit value for the second node is a previous distance at which the ray struck primitives associated with the second node. Further, step 1514 may be performed by processing unit 120 in FIG. 1. In some aspects, storing at least one of the second node ID for the second node or the tHit value for the second node may comprise storing at least one of the second node ID for the second node or the tHit value for the second node in a system memory (SMEM) or a graphics memory (GMEM).

At 1516, the GPU may perform, based on a first ray interval, a closest hit ray traversal process for a third frame in the set of frames starting at the root node, where the first ray interval is equal to a difference between a tMin value for a third node in the plurality of nodes and a tHit value for the third node, where the tMin value for the third node is a minimum distance from a ray origin point for the ray to strike primitives associated with the third node, and where the tHit value for the third node is a previous distance at which the ray struck the primitives associated with the third node, as described in connection with the examples in FIGS. 1-13. For example, as described in 1380 of FIG. 13, GPU 1302 may perform, based on a first ray interval, a closest hit ray traversal process for a third frame in the set of frames starting at the root node, where the first ray interval is equal to a difference between a tMin value for a third node in the plurality of nodes and a tHit value for the third node, where the tMin value for the third node is a minimum distance from a ray origin point for the ray to strike primitives associated with the third node, and where the tHit value for the third node is a previous distance at which the ray struck the primitives associated with the third node. Further, step 1502 may be performed by processing unit 120 in FIG. 1. At 1516, the GPU may also detect whether the ray intersects a closest primitive in the third frame, where the closest primitive corresponds to a third node ID for the third node, as described in connection with the examples in FIGS. 1-13. For example, as described in 1380 of FIG. 13, GPU 1302 may detect whether the ray intersects a closest primitive in the third frame, where the closest primitive corresponds to a third node ID for the third node. At 1516, the GPU may also store the third node ID for the third node if the ray intersects the closest primitive in the third frame, as described in connection with the examples in FIGS. 1-13. For example, as described in 1380 of FIG. 13, GPU 1302 may store the third node ID for the third node if the ray intersects the closest primitive in the third frame. At 1516, the GPU may also re-perform, based on a second ray interval, the closest hit ray traversal process for the third frame starting at the root node, where the second ray interval is equal to a difference between the tHit value for the third node and a tMax value for the third node, where the tMax value for the third node is a maximum distance from a ray origin point for the ray to strike primitives associated with the third node, as described in connection with the examples in FIGS. 1-13. For example, as described in 1380 of FIG. 13, GPU 1302 may re-perform, based on a second ray interval, the closest hit ray traversal process for the third frame starting at the root node, where the second ray interval is equal to a difference between the tHit value for the third node and a tMax value for the third node, where the tMax value for the third node is a maximum distance from a ray origin point for the ray to strike primitives associated with the third node. At 1516, the GPU may also detect, based on the re-performance, that the ray intersects the closest primitive in the third frame; and store the third node ID for the third node based on the detection, as described in connection with the examples in FIGS. 1-13. For example, as described in 1380 of FIG. 13, GPU 1302 may detect, based on the re-performance, that the ray intersects the closest primitive in the third frame; and store the third node ID for the third node based on the detection.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for performing a ray traversal process for a second frame in a set of frames starting at a first node in a plurality of nodes, where a ray in the ray traversal process previously intersected a first primitive in a first frame, where the first primitive corresponds to a first node ID for the first node, and where the second frame is subsequent to the first frame in the set of frames. The apparatus, e.g., processing unit 120, may also include means for detecting whether the ray intersects the first primitive in the second frame. The apparatus, e.g., processing unit 120, may also include means for storing the first node ID for the first node based on the ray intersecting the first primitive in the second frame, or means for re-performing the ray traversal process for the second frame starting at a root node in the plurality of nodes based on the ray not intersecting the first primitive in the second frame.

The subject matter described herein may be implemented to realize one or more benefits or advantages. For instance, the described graphics processing techniques may be used by a GPU, a graphics processor, or some other processor that may perform graphics processing to implement the temporal coherence techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize temporal coherence techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and, based at least in part on information stored in the memory, the at least one processor is configured to: perform a ray traversal process for a second frame in a set of frames starting at a first node in a plurality of nodes, wherein a ray in the ray traversal process previously intersected a first primitive in a first frame, wherein the first primitive corresponds to a first node ID for the first node, and wherein the second frame is subsequent to the first frame in the set of frames; detect whether the ray intersects the first primitive in the second frame; and store the first node ID for the first node based on the ray intersecting the first primitive in the second frame, or re-perform the ray traversal process for the second frame starting at a root node in the plurality of nodes based on the ray not intersecting the first primitive in the second frame.

Aspect 2 is the apparatus of aspect 1, wherein the at least one processor, individually or in any combination, is further configured to: output an indication of the storage of the first node ID for the first node or the re-performance of the ray traversal process for the second frame starting at the root node.

Aspect 3 is the apparatus of aspect 2, wherein to output the indication, the at least one processor, individually or in any combination, is configured to: transmit the indication of the storage of the first node ID for the first node or the re-performance of the ray traversal process for the second frame starting at the root node; or store the indication of the storage the first node ID for the first node or the re-performance of the ray traversal process for the second frame starting at the root node; further comprising at least one of an antenna or a transceiver coupled to the at least one processor, wherein the at least one processor is configured to transmit the indication via at least one of the antenna or the transceiver.

Aspect 4 is the apparatus of any of aspects 1 to 3, wherein the at least one processor, individually or in any combination, is further configured to: detect that the ray intersects a second primitive in the second frame corresponding to a second node in the plurality of nodes, wherein the second node includes a second node ID.

Aspect 5 is the apparatus of aspect 4, wherein the at least one processor, individually or in any combination, is further configured to: store at least one of the second node ID for the second node or a tHit value for the second node, wherein the tHit value for the second node is a previous distance at which the ray struck primitives associated with the second node.

Aspect 6 is the apparatus of aspect 5, wherein to store at least one of the second node ID for the second node or the tHit value for the second node, the at least one processor, individually or in any combination, is configured to: store at least one of the second node ID for the second node or the tHit value for the second node in a system memory (SMEM) or a graphics memory (GMEM).

Aspect 7 is the apparatus of any of aspects 1 to 6, wherein the at least one processor, individually or in any combination, is further configured to: perform, based on a first ray interval, a closest hit ray traversal process for a third frame in the set of frames starting at the root node, wherein the first ray interval is equal to a difference between a tMin value for a third node in the plurality of nodes and a tHit value for the third node, wherein the tMin value for the third node is a minimum distance from a ray origin point for the ray to strike primitives associated with the third node, and wherein the tHit value for the third node is a previous distance at which the ray struck the primitives associated with the third node.

Aspect 8 is the apparatus of aspect 7, wherein the at least one processor, individually or in any combination, is further configured to: detect whether the ray intersects a closest primitive in the third frame, wherein the closest primitive corresponds to a third node ID for the third node.

Aspect 9 is the apparatus of aspect 8, wherein the at least one processor, individually or in any combination, is further configured to: store the third node ID for the third node if the ray intersects the closest primitive in the third frame.

Aspect 10 is the apparatus of any of aspects 8 to 9, wherein the at least one processor, individually or in any combination, is further configured to: re-perform, based on a second ray interval, the closest hit ray traversal process for the third frame starting at the root node, wherein the second ray interval is equal to a difference between the tHit value for the third node and a tMax value for the third node, wherein the tMax value for the third node is a maximum distance from the ray origin point for the ray to strike primitives associated with the third node.

Aspect 11 is the apparatus of aspect 10, wherein the at least one processor, individually or in any combination, is further configured to: detect, based on the re-performance, that the ray intersects the closest primitive in the third frame; and store the third node ID for the third node based on the detection.

Aspect 12 is the apparatus of any of aspects 1 to 11, wherein the at least one processor, individually or in any combination, is further configured to: configure a bounding volume hierarchy (BVH) for the ray traversal process; and perform the ray traversal process for the first frame starting at the root node in the plurality of nodes, wherein the BVH includes the plurality of nodes, and wherein each node in the plurality of nodes corresponds to at least one primitive in a plurality of primitives in the set of frames.

Aspect 13 is the apparatus of aspect 12, wherein the at least one processor, individually or in any combination, is further configured to: detect that the ray in the ray traversal process intersects the first primitive in the first frame corresponding to the first node in the plurality of nodes, wherein the first node includes the first node ID.

Aspect 14 is the apparatus of aspect 13, wherein the at least one processor, individually or in any combination, is further configured to: store at least one of the first node ID for the first node or a tHit value for the first node, wherein the tHit value for the first node is a previous distance at which the ray struck primitives associated with the first node.

Aspect 15 is the apparatus of aspect 14, wherein to store at least one of the first node ID for the first node or the tHit value for the first node, wherein the at least one processor, individually or in any combination, is configured to: store at least one of the first node ID for the first node or the tHit value for the first node in a system memory (SMEM) or a graphics memory (GMEM).

Aspect 16 is the apparatus of any of aspects 12 to 15, wherein each node corresponds to a bounding volume for the plurality of primitives or a bounding box for the plurality of primitives, wherein the ray comprises a plurality of rays, and wherein to perform the ray traversal process for the first frame, the at least one processor, individually or in any combination, is configured to: perform the ray traversal process for the first frame via the plurality of rays.

Aspect 17 is the apparatus of any of aspects 1 to 16, wherein the at least one processor, individually or in any combination, is further configured to: update a cache at a graphics processing unit (GPU) or a memory at the GPU based on the storage of the first node ID for the first node, wherein the first frame is a previous frame in the set of frames and the second frame is a current frame in the set of frames, and wherein the first node is a cache node in the plurality of nodes.

Aspect 18 is the apparatus of any of aspects 1 to 17, where the apparatus is a wireless communication device, further including at least one of an antenna or a transceiver coupled to the at least one processor.

Aspect 19 is a method of graphics processing for implementing any of aspects 1 to 18.

Aspect 20 is an apparatus for graphics processing including means for implementing any of aspects 1 to 18.

Aspect 21 is a computer-readable medium (e.g., a non-transitory computer-readable medium) storing computer executable code, the code when executed by at least one processor causes the at least one processor to implement any of aspects 1 to 18.

What is claimed is:

1. An apparatus for graphics processing, comprising:
   at least one memory; and
   at least one processor coupled to the at least one memory and, based at least in part on information stored in the at least one memory, the at least one processor, individually or in any combination, is configured to:
      perform a ray traversal process for a second frame in a set of frames starting at a first node in a plurality of nodes, wherein a ray in the ray traversal process previously intersected a first primitive in a first frame, wherein the first primitive corresponds to a first node ID for the first node, and wherein the second frame is subsequent to the first frame in the set of frames;
      detect whether the ray intersects the first primitive in the second frame;
      store the first node ID for the first node based on the ray intersecting the first primitive in the second frame, or re-perform the ray traversal process for the second frame starting at a root node in the plurality of nodes based on the ray not intersecting the first primitive in the second frame; and perform, based on a first ray interval, a closest hit ray traversal process for a third frame in the set of frames starting at the root node, wherein the first ray interval is equal to a difference between a tMin value for a third node in the plurality of nodes and a tHit value for the third node, wherein the tMin value for the third node is a minimum distance from a ray origin point for the ray to strike primitives associated with the third node, and wherein the tHit value for the third node is a previous distance at which the ray struck the primitives associated with the third node.

2. The apparatus of claim 1, wherein the at least one processor, individually or in any combination, is further configured to:

output an indication of the storage of the first node ID for the first node or the re-performance of the ray traversal process for the second frame starting at the root node.

3. The apparatus of claim 2, wherein to output the indication, the at least one processor, individually or in any combination, is configured to:

transmit the indication of the storage of the first node ID for the first node or the re-performance of the ray traversal process for the second frame starting at the root node; or store the indication of the storage the first node ID for the first node or the re-performance of the ray traversal process for the second frame starting at the root node;

further comprising at least one of an antenna or a transceiver coupled to the at least one processor, wherein the at least one processor is configured to transmit the indication via at least one of the antenna or the transceiver.

4. The apparatus of claim 1, wherein the at least one processor, individually or in any combination, is further configured to:

detect that the ray intersects a second primitive in the second frame corresponding to a second node in the plurality of nodes, wherein the second node includes a second node ID.

5. The apparatus of claim 4, wherein the at least one processor, individually or in any combination, is further configured to:

store at least one of the second node ID for the second node or a tHit value for the second node, wherein the tHit value for the second node is a previous distance at which the ray struck primitives associated with the second node.

6. The apparatus of claim 5, wherein to store at least one of the second node ID for the second node or the tHit value for the second node, the at least one processor, individually or in any combination, is configured to: store at least one of the second node ID for the second node or the tHit value for the second node in a system memory (SMEM) or a graphics memory (GMEM).

7. The apparatus of claim 1, wherein the at least one processor, individually or in any combination, is further configured to:

detect whether the ray intersects a closest primitive in the third frame, wherein the closest primitive corresponds to a third node ID for the third node.

8. The apparatus of claim 7, wherein the at least one processor, individually or in any combination, is further configured to:

store the third node ID for the third node if the ray intersects the closest primitive in the third frame.

9. The apparatus of claim 7, wherein the at least one processor, individually or in any combination, is further configured to:

re-perform, based on a second ray interval, the closest hit ray traversal process for the third frame starting at the root node, wherein the second ray interval is equal to a difference between the tHit value for the third node and a tMax value for the third node, wherein the tMax value for the third node is a maximum distance from the ray origin point for the ray to strike the primitives associated with the third node.

10. The apparatus of claim 9, wherein the at least one processor, individually or in any combination, is further configured to:

detect, based on the re-performance, that the ray intersects the closest primitive in the third frame; and store the third node ID for the third node based on the detection.

11. The apparatus of claim 1, wherein the at least one processor, individually or in any combination, is further configured to:

configure a bounding volume hierarchy (BVH) for the ray traversal process; and perform the ray traversal process for the first frame starting at the root node in the plurality of nodes, wherein the BVH includes the plurality of nodes, and wherein each node in the plurality of nodes corresponds to at least one primitive in a plurality of primitives in the set of frames.

12. The apparatus of claim 11, wherein the at least one processor, individually or in any combination, is further configured to:

detect that the ray in the ray traversal process intersects the first primitive in the first frame corresponding to the first node in the plurality of nodes, wherein the first node includes the first node ID.

13. The apparatus of claim 12, wherein the at least one processor, individually or in any combination, is further configured to:

store at least one of the first node ID for the first node or a tHit value for the first node, wherein the tHit value for the first node is a previous distance at which the ray struck primitives associated with the first node.

14. The apparatus of claim 13, wherein to store at least one of the first node ID for the first node or the tHit value for the first node, wherein the at least one processor, individually or in any combination, is configured to: store at least one of the first node ID for the first node or the tHit value for the first node in a system memory (SMEM) or a graphics memory (GMEM).

15. The apparatus of claim 11, wherein each node corresponds to a bounding volume for the plurality of primitives or a bounding box for the plurality of primitives, wherein the ray comprises a plurality of rays, and wherein to perform the ray traversal process for the first frame, the at least one processor, individually or in any combination, is configured to: perform the ray traversal process for the first frame via the plurality of rays.

16. The apparatus of claim 1, wherein the at least one processor, individually or in any combination, is further configured to:

update a cache at a graphics processing unit (GPU) or a memory at the GPU based on the storage of the first node ID for the first node, wherein the first frame is a previous frame in the set of frames and the second frame is a current frame in the set of frames, and wherein the first node is a cache node in the plurality of nodes.

17. A method of graphics processing, comprising:

performing a ray traversal process for a second frame in a set of frames starting at a first node in a plurality of nodes, wherein a ray in the ray traversal process previously intersected a first primitive in a first frame, wherein the first primitive corresponds to a first node ID for the first node, and wherein the second frame is subsequent to the first frame in the set of frames;

detecting whether the ray intersects the first primitive in the second frame;

storing the first node ID for the first node based on the ray intersecting the first primitive in the second frame, or re-performing the ray traversal process for the second frame starting at a root node in the plurality of nodes based on the ray not intersecting the first primitive in the second frame; and performing, based on a first ray interval, a closest hit ray traversal process for a third frame in the set of frames starting at the root node, wherein the first ray interval is equal to a difference between a tMin value for a third node in the plurality of nodes and a tHit value for the third node, wherein the tMin value for the third node is a minimum distance from a ray origin point for the ray to strike primitives associated with the third node, and wherein the tHit value for the third node is a previous distance at which the ray struck the primitives associated with the third node.

18. The method of claim 17, further comprising:

outputting an indication of the storage of the first node ID for the first node or the re-performance of the ray traversal process for the second frame starting at the root node.

19. The method of claim 18, wherein outputting the indication comprises:

transmitting the indication of the storage of the first node ID for the first node or the re-performance of the ray traversal process for the second frame starting at the root node; or storing the indication of the storage the first node ID for the first node or the re-performance of the ray traversal process for the second frame starting at the root node.

20. The method of claim 17, further comprising:

detecting that the ray intersects a second primitive in the second frame corresponding to a second node in the plurality of nodes, wherein the second node includes a second node ID; and storing at least one of the second node ID for the second node or a tHit value for the second node, wherein the tHit value for the second node is a previous distance at which the ray struck primitives associated with the second node.

21. The method of claim 20, wherein storing at least one of the second node ID for the second node or the tHit value for the second node comprises storing at least one of the second node ID for the second node or the tHit value for the second node in a system memory (SMEM) or a graphics memory (GMEM).

22. The method of claim 17, further comprising:

detecting whether the ray intersects a closest primitive in the third frame, wherein the closest primitive corresponds to a third node ID for the third node; and storing the third node ID for the third node if the ray intersects the closest primitive in the third frame; or re-performing, based on a second ray interval, the closest hit ray traversal process for the third frame starting at the root node, wherein the second ray interval is equal to a difference between the tHit value for the third node and a tMax value for the third node, wherein the tMax value for the third node is a maximum distance from the ray origin point for the ray to strike the primitives associated with the third node.

23. The method of claim 22, further comprising:

detecting, based on the re-performance, that the ray intersects the closest primitive in the third frame; and storing the third node ID for the third node based on the detection.

24. The method of claim 17, further comprising:

configuring a bounding volume hierarchy (BVH) for the ray traversal process; and performing the ray traversal process for the first frame starting at the root node in the plurality of nodes, wherein the BVH includes the plurality of nodes, and wherein each node in the plurality of nodes corresponds to at least one primitive in a plurality of primitives in the set of frames.

25. The method of claim 24, further comprising:

detecting that the ray in the ray traversal process intersects the first primitive in the first frame corresponding to the first node in the plurality of nodes, wherein the first node includes the first node ID; and storing at least one of the first node ID for the first node or a tHit value for the first node, wherein the tHit value for the first node is a previous distance at which the ray struck primitives associated with the first node;

wherein storing at least one of the first node ID for the first node or the tHit value for the first node comprises storing at least one of the first node ID for the first node or the tHit value for the first node in a system memory (SMEM) or a graphics memory (GMEM); and wherein each node corresponds to a bounding volume for the plurality of primitives or a bounding box for the plurality of primitives, wherein the ray comprises a plurality of rays, and wherein performing the ray traversal process for the first frame comprises performing the ray traversal process for the first frame via the plurality of rays.

26. The method of claim 17, further comprising:

updating a cache at a graphics processing unit (GPU) or a memory at the GPU based on the storage of the first node ID for the first node, wherein the first frame is a previous frame in the set of frames and the second frame is a current frame in the set of frames, and wherein the first node is a cache node in the plurality of nodes.

27. An apparatus for graphics processing, comprising:

means for performing a ray traversal process for a second frame in a set of frames starting at a first node in a plurality of nodes, wherein a ray in the ray traversal process previously intersected a first primitive in a first frame, wherein the first primitive corresponds to a first node ID for the first node, and wherein the second frame is subsequent to the first frame in the set of frames;

means for detecting whether the ray intersects the first primitive in the second frame;

means for storing the first node ID for the first node based on the ray intersecting the first primitive in the second frame, or re-performing the ray traversal process for the second frame starting at a root node in the plurality of nodes based on the ray not intersecting the first primitive in the second frame; and means for performing, based on a first ray interval, a closest hit ray traversal process for a third frame in the set of frames starting at the root node, wherein the first ray interval is equal to a difference between a tMin value for a third node in the plurality of nodes and a tHit value for the third node, wherein the tMin value for the third node is a minimum distance from a ray origin point for the ray to strike primitives associated with the third node, and wherein the tHit value for the third node is a previous distance at which the ray struck the primitives associated with the third node.

\* \* \* \* \*